United States Patent
Nakayama et al.

(10) Patent No.: US 8,955,980 B2
(45) Date of Patent: Feb. 17, 2015

(54) IMAGE DISPLAY APPARATUS WHICH REDUCES SPECKLE NOISE AND WHICH OPERATES WITH LOW POWER CONSUMPTION

(75) Inventors: Kenji Nakayama, Osaka (JP); Tetsuro Mizushima, Hyogo (JP); Tatsuo Itoh, Osaka (JP); Hiroyuki Furuya, Osaka (JP)

(73) Assignee: Panasonic Corporation, Osaka (JP)

( * ) Notice: Subject to any disclaimer, the term of this patent is extended or adjusted under 35 U.S.C. 154(b) by 727 days.

(21) Appl. No.: 12/990,076

(22) PCT Filed: Apr. 6, 2010

(86) PCT No.: PCT/JP2010/002517
§ 371 (c)(1),
(2), (4) Date: Oct. 28, 2010

(87) PCT Pub. No.: WO2010/116727
PCT Pub. Date: Oct. 14, 2010

(65) Prior Publication Data
US 2011/0043768 A1  Feb. 24, 2011

(30) Foreign Application Priority Data

Apr. 10, 2009  (JP) ................................ 2009-095805
Apr. 15, 2009  (JP) ................................ 2009-098677

(51) Int. Cl.
G03B 21/14 (2006.01)
G02B 27/48 (2006.01)
G03B 21/00 (2006.01)

(52) U.S. Cl.
CPC ................ *G02B 27/48* (2013.01); *G03B 21/00* (2013.01); *G03B 21/14* (2013.01)
USPC ................................. 353/38; 353/31; 353/81

(58) Field of Classification Search
CPC ........................................................ G02B 27/48
USPC ...................... 353/77, 78, 94, 98, 99, 122, 38
See application file for complete search history.

(56) References Cited

U.S. PATENT DOCUMENTS 6,594,090 B2  7/2003  Kruschwitz et al.
7,271,962 B2  9/2007  Kasazumi et al.

(Continued)

FOREIGN PATENT DOCUMENTS

| | | |
|---|---|---|
| JP | 2002-296514 | 10/2002 |
| JP | 2003-98476 | 4/2003 |
| JP | 2005-301164 | 10/2005 |
| JP | 2006-276156 | 10/2006 |
| JP | 2008-122823 | 5/2008 |
| JP | 2008-203699 | 9/2008 |
| JP | 2008-216923 | 9/2008 |
| WO | 2005/008330 | 1/2005 |
| WO | 2005/098532 | 10/2005 |
| WO | 2008/041559 | 4/2008 |

OTHER PUBLICATIONS

International Search Report issued Jul. 20, 2010 in International (PCT) Application No. PCT/JP2010/002517.

*Primary Examiner* — Sultan Chowdhury
*Assistant Examiner* — Bao-Luan Le
(74) *Attorney, Agent, or Firm* — Wenderoth, Lind & Ponack, L.L.P.

(57) ABSTRACT

An image display apparatus includes: a laser light source for outputting a laser beam; a diffusion optical element for diffusing the laser beam; a drive unit for oscillating the diffusion optical element; and an image conversion unit for converting the laser beam output from the diffusion optical element into an image. The diffusion optical element disposed in the drive unit is oscillated and operated in a state where an amplitude of the drive of the drive unit, which is, for example, an amplitude that is driven in a direction of the arrow X in a plane that is perpendicular to an optical axis, is not constant.

19 Claims, 19 Drawing Sheets

(56) References Cited

U.S. PATENT DOCUMENTS

| | | |
|---|---|---|
| 7,399,084 B2 | 7/2008 | Morikawa et al. |
| 2003/0039036 A1 | 2/2003 | Kruschwitz et al. |
| 2006/0023165 A1* | 2/2006 | Ishihara et al. ............ 353/20 |
| 2006/0227293 A1 | 10/2006 | Kasazumi et al. |
| 2007/0058135 A1 | 3/2007 | Morikawa et al. |
| 2008/0088804 A1* | 4/2008 | Peterson et al. ............ 353/69 |
| 2008/0165401 A1* | 7/2008 | Kasazumi ............ 359/196 |
| 2008/0204667 A1 | 8/2008 | Kobori et al. |
| 2008/0247022 A1* | 10/2008 | Yamauchi et al. ......... 359/211 |
| 2009/0147220 A1* | 6/2009 | Agostinelli et al. ......... 353/31 |
| 2010/0039585 A1* | 2/2010 | Nakayama et al. ......... 349/64 |
| 2010/0045894 A1 | 2/2010 | Itoh et al. |
| 2011/0102748 A1* | 5/2011 | Shevlin et al. ............ 353/38 |

* cited by examiner

IMAGE DISPLAY APPARATUS WHICH REDUCES SPECKLE NOISE AND WHICH OPERATES WITH LOW POWER CONSUMPTION

TECHNICAL FIELD

The present invention relates to a compact image display apparatus with reduced speckle noise and which operates with low power consumption in a compact image display apparatus using laser or the like as its light source.

BACKGROUND ART

In recent years, an image display apparatus using laser as its light source is attracting attention of being able to display high resolution images in a broad color reproducible range by utilizing the monochromatic property of the laser beam. Moreover, since a laser light source is close to an ideal point light source, collection of light is easier in comparison to a lamp light source. Thus, it is possible to downsize the optical system without deteriorating the light use efficiency, and realize a compact image display apparatus with low power consumption.

Nevertheless, when using a laser beam of a semiconductor laser or the like with high coherency as the light source, generally speaking, glare known as speckle noise in the displayed image becomes a problem upon displaying favorable images. Speckle noise is an interference pattern (hereinafter referred to as the "speckle pattern") that is created on the retina of the observer due to the high coherency of the laser. It is necessary to reduce the speckle noise in order to display favorable images.

In order to overcome the foregoing problem, attempts have been made for reducing the speckle noise by disposing a light scattering object on a light path between the laser light source of the image display apparatus and the screen, or by forming numerous speckle patterns by disposing and oscillating a diffuser (for example, refer to Patent Documents 1 and 2). As a result of disposing the light scattering object or the diffuser at the optimal position on the light path, or satisfying a given relationship between the particle size of the diffuser and the oscillation speed of the diffuser, the light quantity loss after the laser beam is scattered or diffused can be kept low, and speckle noise can be effective reduced.

Moreover, by disposing a plurality of diffusers and a spatial modulation element on the light path between the laser light source and the screen and disposing at least one among the plurality of diffusers on one end of a diaphragm configured from a magnetic material, it is said that the speckle noise can be reduced by oscillating the diaphragm with the operation of the electromagnet (refer to Patent Document 3).

Moreover, an attempt has been made for reducing the speckle noise by disposing a light tunnel on the light path between the laser light source of the image display apparatus and the screen, causing a laser beam to enter the light tunnel, and oscillating a conical prism for collecting and coupling the laser beams in the light tunnel in a direction that is parallel with the optical axis (for example, refer to Patent Document 4). According to the foregoing configuration, it is said that it is possible to realize multiple reflection which is required for uniformizing the intensity distribution in a short light path length, and reduce the speckle noise by changing the light path of the luminous flux that reaches the screen via an optical system including the conical prism and the like.

Nevertheless, with the conventional technologies described above, there is a problem in that the apparatus needs to be enlarged if a light scattering object is disposed or a motor is used to oscillate the diffuser. Moreover, if a diffuser is disposed at one end of the diaphragm and the diaphragm is oscillated based on the operation of the electromagnet without using a motor, although the apparatus can be downsized, the electromagnet will also become compact as the apparatus is downsized, and there is a problem in that it is difficult to increase the amplitude of the diaphragm. If the amplitude of the diaphragm is small, the reduction effect of the speckle noise cannot be sufficiently yielded. As described above, it was difficult to realize both the downsizing of the image display apparatus and the reduction of the speckle noise with the conventional configurations described above.

Patent Document 1: WO 2005/098532
Patent Document 2: WO 2005/008330
Patent Document 3: Japanese Patent Application Publication No. 2005-301164
Patent Document 4: Japanese Patent Application Publication No. 2008-216923

Summary OF THE INVENTION

An object of this invention is to provide a compact image display apparatus capable of displaying high quality images with reduced speckle noise.

In order to achieve the foregoing object, the image display apparatus according to one aspect of the present invention includes: a light source for outputting light to be used for display; an interference pattern changing optical element for temporally changing an interference pattern that is formed with the light; a drive unit for driving and oscillating the interference pattern changing optical element; and an image conversion unit for converting the light into an image, wherein an amplitude or a frequency of a drive signal of the drive unit is not temporally constant.

According to the foregoing configuration, as a result of the amplitude of the drive signal not being constant, the speckle pattern that is formed with the interference pattern changing optical element when the amplitude of the interference pattern changing optical element is maximum will temporally change. Consequently, it is possible to realize a compact image display apparatus capable of inhibiting the speckle pattern when the amplitude of the interference pattern changing optical element is maximum from becoming accentuated, and displaying high quality images with reduced speckle noise.

Moreover, as a result of the frequency of the drive signal not being constant also, the speckle pattern that is formed with the interference pattern changing optical element when the amplitude of the interference pattern changing optical element is maximum will temporally change. Consequently, it is possible to realize a compact image display apparatus capable of inhibiting the speckle pattern when the amplitude of the interference pattern changing optical element is maximum from becoming accentuated, and displaying high quality images with reduced speckle noise.

Other objects, features and superior aspects of the present invention shall become apparent from the ensuing explanation. In addition, advantages of the present invention shall become evident from the ensuing explanation with reference to the attached drawings.

DETAILED DESCRIPTION OF THE INVENTION

Figure 1:
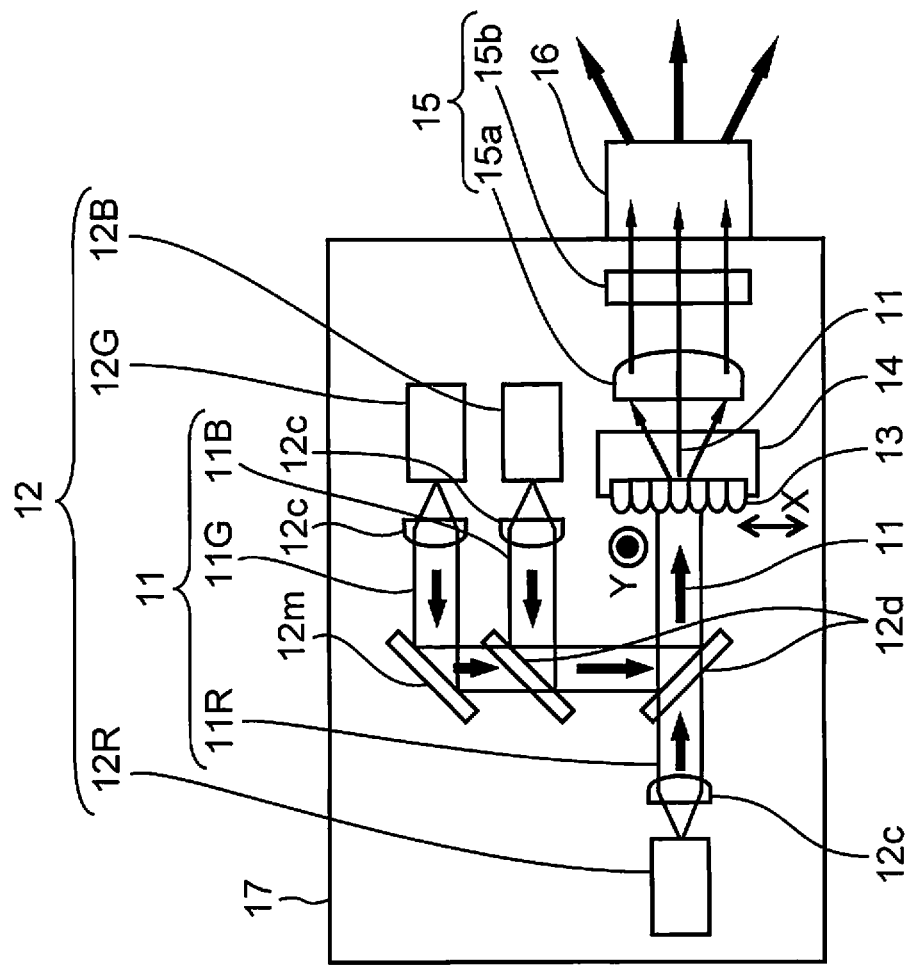
FIG. 1 is a plan view showing a schematic configuration of the image display apparatus according to an embodiment of the present invention.

Embodiments of the present invention are now explained with reference to the attached drawings. Note that the same constituent elements or the constituent elements that yield the same operation and effect are given the same reference numeral, and the explanation thereof may be omitted. In addition, the diagrams schematically show the respective constituent elements as the subject for ease of understanding, and shapes and the like are also displayed schematically.

(First Embodiment)

As described above, conventionally, there is configuration where a diffuser is disposed at one end of the diaphragm and the diaphragm is oscillated based on the operation of the electromagnet without using a motor, and the apparatus can be downsized with this configuration in comparison to a case of using a motor. Nevertheless, the electromagnet will also become compact as the image display apparatus is downsized, and there is a problem in that it is difficult to increase the amplitude of the diaphragm.

In order to overcome this problem, considered may be a method of oscillating the diaphragm with the resonance frequency of the diaphragm in a compact apparatus based on the operation of the electromagnet in order to increase the amplitude of the diaphragm. If the diaphragm is oscillated with the resonance frequency, the gain (amplitude of diaphragm/input power to electromagnet) can be sufficiently increased, and a sufficient amplitude can be obtained even with a compact apparatus.

Nevertheless, if the diaphragm is oscillated with the resonance frequency of the diaphragm, the additional problems described below will arise. Specifically, the time that the diffuser is positioned at a location where the amplitude of the oscillating diaphragm becomes maximum will be sufficiently greater than the time that the diaphragm is positioned at the other respective amplitudes. This is because, if the diaphragm is driven with the resonance frequency, the oscillatory waveform of the diaphragm will be a sine wave, and the speed of the diaphragm will be zero at the location where the amplitude becomes maximum.

For example, if the diffuser is oscillated with a sine wave, the speed of the diaphragm will become zero at the position where the amplitude becomes maximum, and the speed will become relatively slow in the vicinity of the position where the amplitude becomes maximum. In other words, in the vicinity of the position where the amplitude becomes maximum, the change in the position of the diaphragm relative to time will become smaller in comparison to the positions of the other respective amplitudes. Here, the observer will recognize the time-integrated speckle pattern created with the diaphragm as speckle noise. Thus, if time integration is performed, the speckle pattern that is generated where the change in the position of the diaphragm relative to time is small and the amplitude becomes maximum will become accentuated. Due to the foregoing reason, there is a problem in that the speckle noise cannot be sufficiently reduced and it is difficult to obtain favorable images.

Thus, the image display apparatus according to this embodiment realizes a compact image display apparatus with sufficiently reduced speckle noise, without having to use a motor, as a result of oscillating the diffusion optical element with various amplitudes or frequencies and generating a large indefinite number of speckle patterns by driving the drive unit upon changing the amplitude in a non-constant manner or changing the frequency in a non-constant manner of the drive of the drive unit for oscillating the diffusion optical element such as a diffuser or the like. The image display apparatus of this embodiment is now explained in detail with reference to the attached drawings.

FIG. 1 is a plan view showing a schematic configuration of the image display apparatus 10 according to the first embodiment of the present invention.

As shown in FIG. 1, the image display apparatus 10 of the first embodiment comprises a laser light source 12 for outputting a laser beam 11, a diffusion optical element 13 as an interference pattern changing optical element for diffusing the laser beam 11, a drive unit 14 for oscillating the diffusion optical element 13, and an image conversion unit 15 for converting the laser beam 11 that was output from the diffusion optical element 13 into an image. These component members 11 to 15 are provided in a case 17. The image display apparatus 10 oscillates and operates the diffusion optical element 13 disposed in the drive unit 14 in a state where the amplitude of the drive of the drive unit 14; for example, the amplitude that is driven in the direction (first axis direction) of the arrow X in a plane that is perpendicular to the optical axis is not constant (hereinafter referred to as the "AM modulation").

Here, the laser light source 12 is configured, for instance, as a RGB light source including a red laser light source (hereinafter referred to as the "R light source") 12R for outputting a red laser beam (hereinafter referred to as the "R light") 11R, a green laser light source (hereinafter referred to as the "G light source") 12G for outputting a green laser beam (hereinafter referred to as the "G light") 11G, and a blue laser light source (hereinafter referred to as the "B light source") 12B for outputting a blue laser beam (hereinafter referred to as the "B light") 11B.

As shown in FIG. 1, the R light 11R, the G light 11G and the B light 11B output from the laser light source 12 are respectively converted into parallel light beams with the collimated lens 12c and enter the diffusion optical element 13 such as frosted glass of the drive unit 14 as the laser beam 11 that is combined as one optical axis by a mirror 12m and two dichroic mirrors 12d. Here, the laser beam 11 is spread with the diffusion optical element 13 by passing through near the center of the diffusion optical element 13 that is driven in a direction that is perpendicular to the direction of its optical axis; for example, in the direction of the arrow X. Subsequently, the laser beam 11 is converted into an approximately parallel light beam with a lens 15a configuring the image conversion unit 15, and thereafter passes through the spatial modulation element 15b. After being modulated with an image signal in the spatial modulation element 15b, the laser beam 11 is projected as an image with a projection lens 16 and displayed on a screen (not shown) or the like. Note that the image conversion unit 15 is configured, as shown in FIG. 1, by including the lens 15a and the spatial modulation element 15b. Used as the spatial modulation element 15b is, for example, a transmissive liquid crystal display panel or the like as described later.

Figure 2:
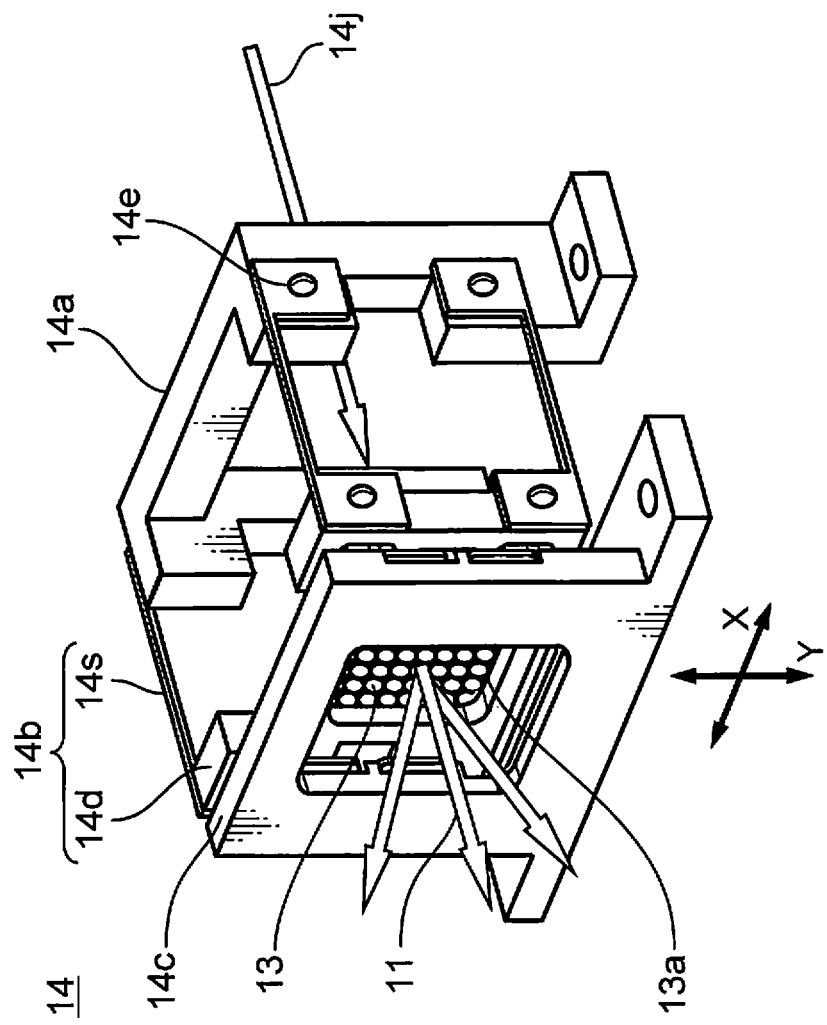
FIG. 2 is a perspective view showing an example of the drive unit that is used in the image display apparatus according to an embodiment of the present invention.
Figure 3:
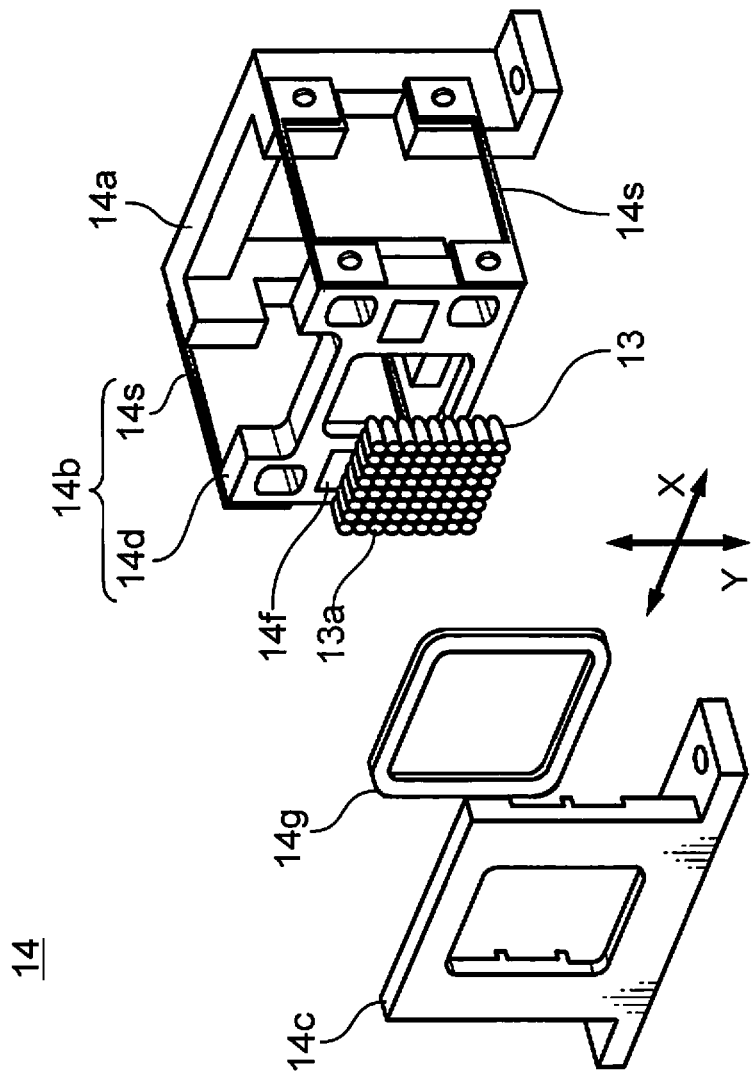
FIG. 3 is an exploded perspective view of the drive unit of FIG. 2.

A specific example of the drive unit 14 is now explained. FIG. 2 is a perspective view of the actuator showing an example of the drive unit 14 that is used in the image display apparatus 10 of the present invention. FIG. 3 shows an exploded perspective view of the drive unit 14. As shown in FIG. 2 and FIG. 3, the drive unit 14 is configured by including a base 14a, a moving part 14b for driving the diffusion optical element 13 to oscillate freely in the direction of the arrow X, and a stopper base 14c. The diffusion optical element 13 is mounted on a holder 14d configuring the moving part 14b, and fixed to a fixing part 14e with one end of four suspensions (flexible support members) 14s; for example, wires formed from a material such as copper. A magnet 14f formed from a material such as neodymium is fitted into and fixed to the holder 14d, and an X axis direction coil 14g is fixed to the stopper base 14c. The X axis direction coil 14g is able to apply current, and the flux of electromagnetic induction resulting from the applied current interacts with the magnetic field that is generated with the magnet 14f. Consequently, the moving part 14b is moved and oscillated, with the diffusion optical element 13 mounted thereon, in the direction of the arrow X. Here, the diffusion optical element 13 is of a tabular shape, and the principal surface 13a of the diffusion optical element 13 is mounted on the moving part 14b by being disposed in a direction that is perpendicular to the optical axis 14j. Since the base 14a and the holder 14d are coupled with a parallel link structure with the suspensions 14s, the diffusion optical element 13 will move upon retaining the parallelism with the XY plane formed with the X axis (first axis direction) and the Y axis (second axis direction). Thus, the diffusion optical element 13 and the optical axis 14j are constantly perpendicular regardless of the movement of the moving part 14b. If the optical axis 14j and the incidence angle of the diffusion optical element 13 change, the transmission factor of the diffusion optical element 13 will change or the intensity distribution of the laser beam 11 will change due to the difference in the incidence angle, and luminance unevenness or color unevenness of the image may occur. According to the configuration of the present embodiment where the diffusion optical element 13 and the optical axis 14j are constantly perpendicular, it is possible to display images which inhibit the generation of luminance unevenness or color unevenness.

Figure 4:
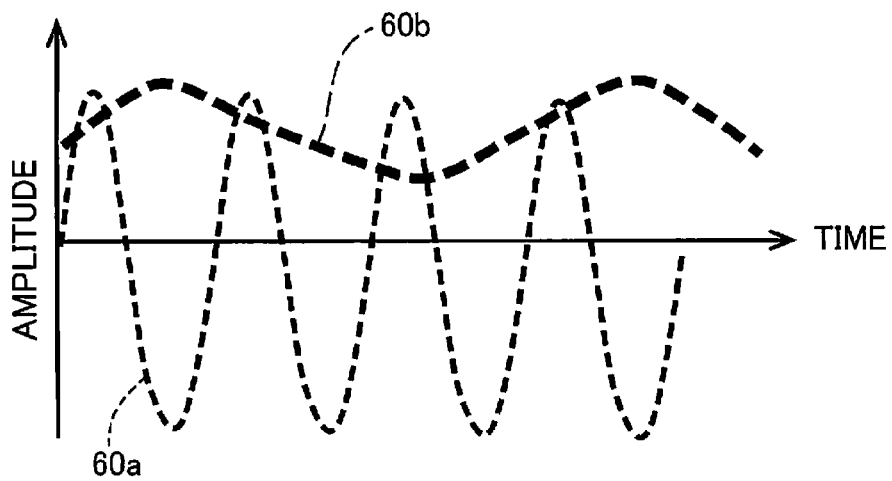
FIG. 4 is a waveform diagram showing the signals of two frequencies according to an embodiment of the present invention.
Figure 5:
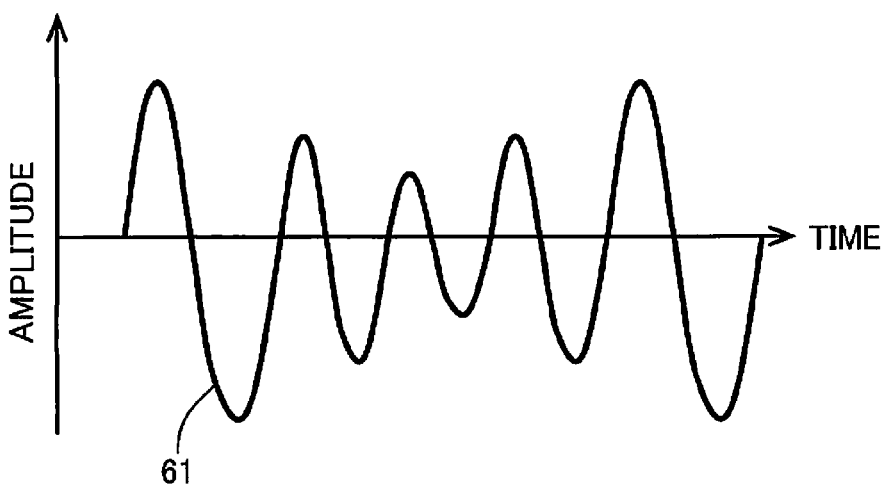
FIG. 5 is a waveform diagram showing the waveform of a drive signal in which the signals of the two frequencies shown in FIG. 4 were superimposed.

A specific drive signal of the drive unit 14 is now explained. FIG. 4 is a diagram showing signals 60a and 60b of two different frequencies (hereinafter referred to as the first frequency 60a and the second frequency 60b). FIG. 5 is a diagram showing a current waveform of the drive signal that was subject to AM modulation. In order to oscillate the diffusion optical element 13 by subjecting it to AM modulation, as shown in FIG. 4, for example, the first frequency 60a and the second frequency 60b are superimposed on the X axis coil. Here, the relatively high frequency is the first frequency 60a and the lower frequency is the second frequency 60b. When the first frequency 60a and the second frequency 60b are superimposed, as shown in FIG. 5, it is possible to create a drive signal of the current waveform 61 subject to AM modulation in which the amplitude is not constant. Here, the magnetic field that is created by the X axis coil 14g is decided based on the current value of the drive signal. Moreover, the amplitude of the holder 14d is decided based on the interaction of the magnetic field created with the X axis coil, and the magnet 14f. Thus, the oscillation of the holder 14d is also subject to AM modulation based on the drive signal of the current waveform 61 that was subject to AM modulation.

Although the two signals 60a and 60b with different frequencies were superimposed to create the drive signal of the drive unit 14 in the foregoing example, the drive signal of the drive unit 14 can also be formed by superimposing three or more signals with different frequencies. As a result of superimposing a plurality of signals with difference frequencies, an arbitrary drive signal subject to AM modulation can be easily created.

Figure 6:
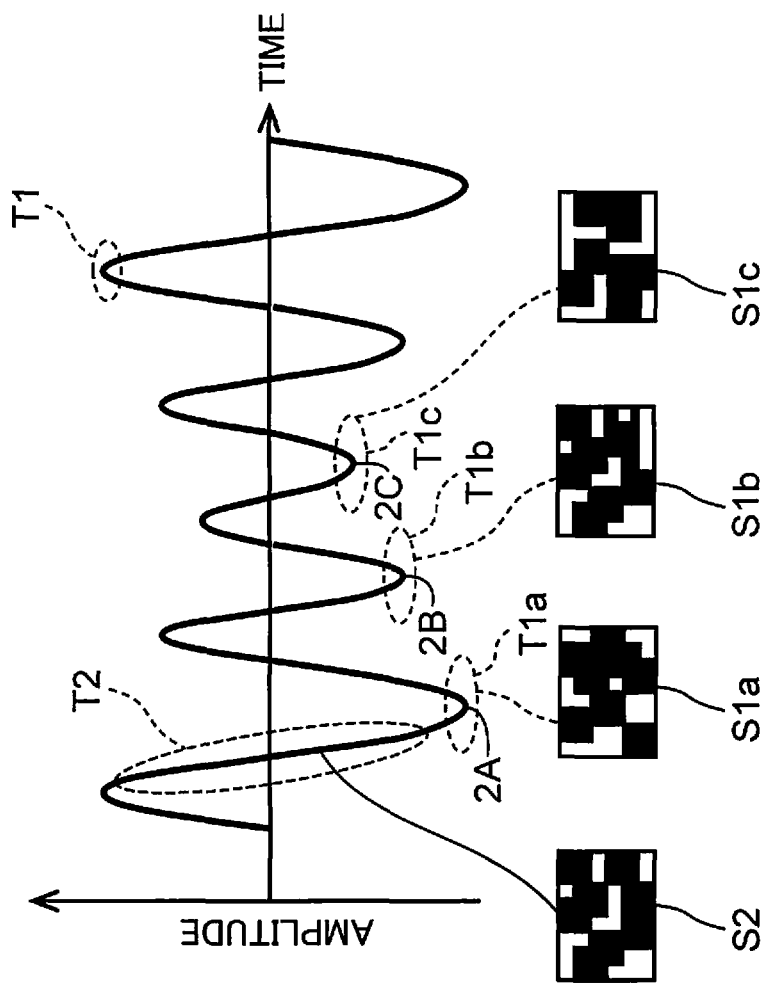
FIG. 6 is a diagram showing a state where the drive unit disposed in the diffusion optical element is being oscillated and operated in the direction of the arrow X, and is an explanatory diagram showing the oscillation when the amplitude is not constant in relation to the time axis.
Figure 7:
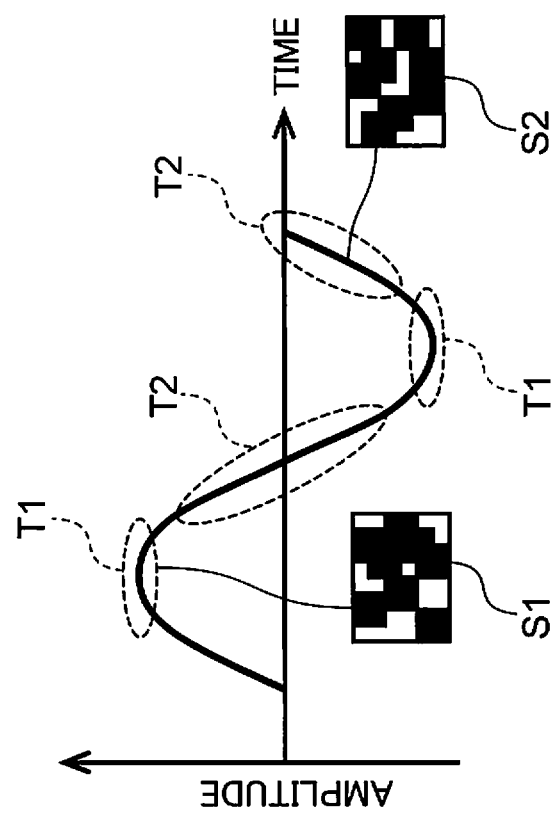
FIG. 7 is a diagram showing a state where the drive unit disposed in the diffusion optical element is being oscillated and operated in the direction of the arrow X, and is an explanatory diagram showing one frequency of the oscillation when the amplitude is constant in relation to the time axis.

FIG. 6 and FIG. 7 are diagrams showing a state where the drive unit 14 disposed in the diffusion optical element 13 is being oscillated and operated in the direction of the arrow X. Here, FIG. 6 is a diagram showing the oscillation of the diffusion optical element 13 during the AM modulation according to this embodiment. Meanwhile, FIG. 7 is a diagram showing one cycle of the conventional oscillation in which the amplitude is constant in relation to the time axis.

As shown in FIG. 7, if the amplitude of the drive signal is temporally constant, the time domain T1 where the amplitude becomes maximum includes a state where the speed of the diffusion optical element 13 is zero. In addition, in the time domain T1, since the diffusion optical element 13 will hardly move in the direction of the arrow X, a speckle pattern S1 of an approximately similar rest point will be created. Meanwhile, in the case of the time domain T2 in which the amplitude of the drive signal changes from maximum to minimum or from minimum to maximum, the diffusion optical element 13 moves at a sufficiently fast speed in the direction of the arrow X in comparison to the time domain T1. Thus, a speckle pattern S2 of the oscillation points will variously change. For example, if the drive unit 14 is operated with a drive signal of a waveform of a sine wave and the amplitude is 1 mm and the frequency is 120 Hz, the time domain T1 where the amplitude becomes maximum will include the time in which the speed of the drive unit 14 is zero, and the maximum speed of the time domain T2 will be 0.75 m/s.

If the speckle pattern moves sufficiently faster than the temporal resolution of a human eye, a human eye will recognize the speckle noise as a time-integrated speckle pattern. In the foregoing case, it is possible to display favorable images free of image glare. Nevertheless, as shown in FIG. 7, if the drive unit 14 is oscillated and the diffusion optical element 13 moved in connection with the drive unit 14, the movement of the speckle pattern will slow down in the time domain T1, and there may be cases where the speckle pattern S1 that can be recognized with the human eye is observed, and it is not possible to display favorable images free from image glare.

Meanwhile, as with the image display apparatus 10 shown in the first embodiment of the present invention, if the amplitude of the drive of the drive unit 14 is operated based on AM modulation as shown in FIG. 6, speckle patterns S1a, S1b, S1c of respectively different rest points are generated in the time domains T1a, T1b, T1c of the maximum points or minimum points 2A, 2B, 2C of a plurality of amplitudes. Moreover, in the case of the time domain T2 where the amplitude changes from maximum to minimum or from minimum to maximum, as with FIG. 7, the diffusion optical element 13 will move at a sufficiently fast speed in the direction of the arrow X in comparison to the time domain T1 even in FIG. 6, and the speckle pattern S2 of the oscillation points will variously change. Consequently, if the amplitude of the drive of the drive unit 14 is oscillated in a non-constant manner as shown in FIG. 6, the respective speckle patterns S2, S1a, S1b, S1c are averaged, and it is possible to display images with sufficiently reduced speckle noise.

The drive unit 14 may also apply current to the X axis coil 14g with a drive signal with the same frequency as the resonance frequency that can be calculated from the spring constant of the suspension 14s or the mass of the holder 14d and the magnet 14f. In the foregoing case, since the drive unit 14 will oscillate the holder 14d based on resonance, the gain (oscillation amplitude of the holder 14d/current value applied to the X axis coil 14g) will increase. If the gain increases, the amplitude of the holder 14d will increase if the current value of the X axis coil 14g is constant. If the oscillation amplitude of the holder 14d is great, the area of the diffusion optical element 13 which the beam passes through will become great, the number of speckle patterns observed per unit time will increase, and the speckle noise can be reduced. Moreover, if the gain is increased, the current to be applied to the X axis coil will be smaller than in cases where the gain is small if the oscillation amplitude of the holder 14d is constant. Thus, it is possible to reduce the power for driving the drive unit 14, and realize an image display apparatus with low power consumption.

Note that if the first frequency 60a is the same frequency as the resonance frequency, the second frequency 60b may be a frequency that temporally changes the first frequency 60a and not a frequency that modulates the amplitude of the current. This is because in the vicinity of the resonance frequency, the gain will change significantly in relation to the change in the frequency, and, if the frequency to be applied to the X axis coil 14g is slightly change from the resonance frequency; for example, approximately 10 Hz, the gain will change by sufficiently increasing, and the oscillation amplitude of the holder 14d will consequently change.

If the actuator of the drive unit 14 is to be driven more stably, the first frequency 60a may be shifted ±5 Hz from the resonance frequency. If the actuator is driven with a drive signal of a frequency that is slightly shifted from the resonance frequency, although the gain will decrease in comparison to the case of using a resonance frequency, it is possible to prevent the oscillation amplitude of the holder 14d from increasing excessively in relation to changes in the current value caused by impact from the outside of the apparatus or signal noise or the like.

Moreover, the first frequency 60a of the drive unit 14 is preferably 30 Hz or higher and 300 Hz or less. If the frequency of the drive signal of the drive unit 14 is too low, the time domain where the speckle patterns S1a, S1b, S1c displayed at the rest point will approach the length of the temporal resolution of the human eye, and this is undesirable since the speckle patterns S1a, S1b, S1c will become conspicuous at the rest point. Meanwhile, if the frequency of the drive signal of the drive unit 14 is too large, the drive will not be able to mechanically follow the frequency, and the amplitude of the drive will consequently become small, or the power consumption will increase for obtaining the required amplitude of the drive. To put it differently, when the frequency of the drive signal of the drive unit 14 is 30 Hz or higher and 300 Hz or less, the speckle noise can be sufficiently reduced with low power consumption.

Note that, when using a liquid crystal display panel as the spatial modulation element 15b and a laser light source for outputting a laser beam of linear polarized light as the light source, the diffusion optical element 13 is preferably a lenticular lens based on the reasons described later.

Figure 8:
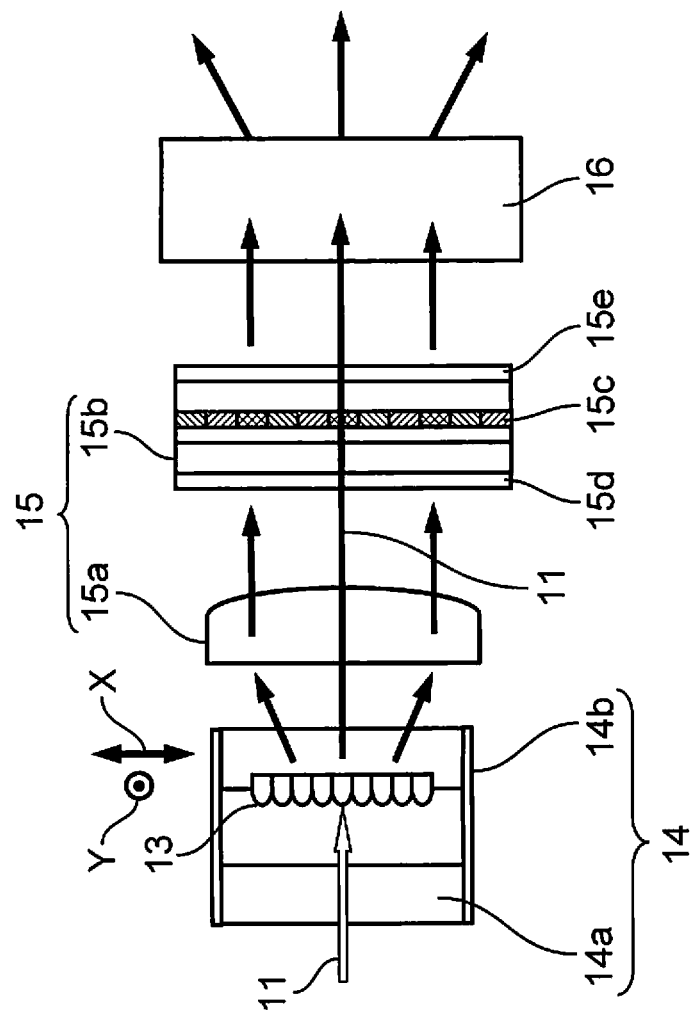
FIG. 8 is a schematic plan view showing an enlarged configuration of the optical system from the drive unit to the projection lens in the image display apparatus according to an embodiment of the present invention.

FIG. 8 is a plan view showing an enlarged configuration of the optical system from the drive unit 14 to the projection lens 16. The laser beam 11 passes through the diffusion optical element 13 mounted on the drive unit 14 that is driven in the directions of the arrow X and the arrow Y, thereafter once again converted into a parallel light beam with the lens 15a of the image conversion unit 15, and then enters the spatial modulation element 15b; for example, the transmissive liquid crystal display panel 15c. Here, the spatial modulation element 15b includes the transmissive liquid crystal display panel 15c, and the laser beam 11 that is output from the laser light source 12 is preferably linear polarized light in which the directions of the polarized light are aligned, and preferably linear polarized light of the predetermined direction relative to the transmissive liquid crystal display panel 15c. Specifically, of the entrance-side polarization plate 15d and the exit-side polarization plate 15e of the transmissive liquid crystal display panel 15c, if the entrance-side polarization plate 15d is a polarization plate which only passes through the P polarized light, it is preferably to select a laser light source 12 that only passes through the P polarized light when the laser beam 11 is output from the laser light source 12. Consequently, the laser beam 11 will enter the liquid crystal display panel 15c with hardly any light quantity loss. Moreover, in the foregoing case, since the entrance-side polarization plate 15d is not functioning to block the S polarized light, it is also possible to use a low-cost liquid crystal display panel which does not include the entrance-side polarization plate 15d. According to the foregoing configuration, it is possible to realize a compact image display apparatus 10 with reduced speckle noise, high light use efficiency and low power consumption.

Figure 9:
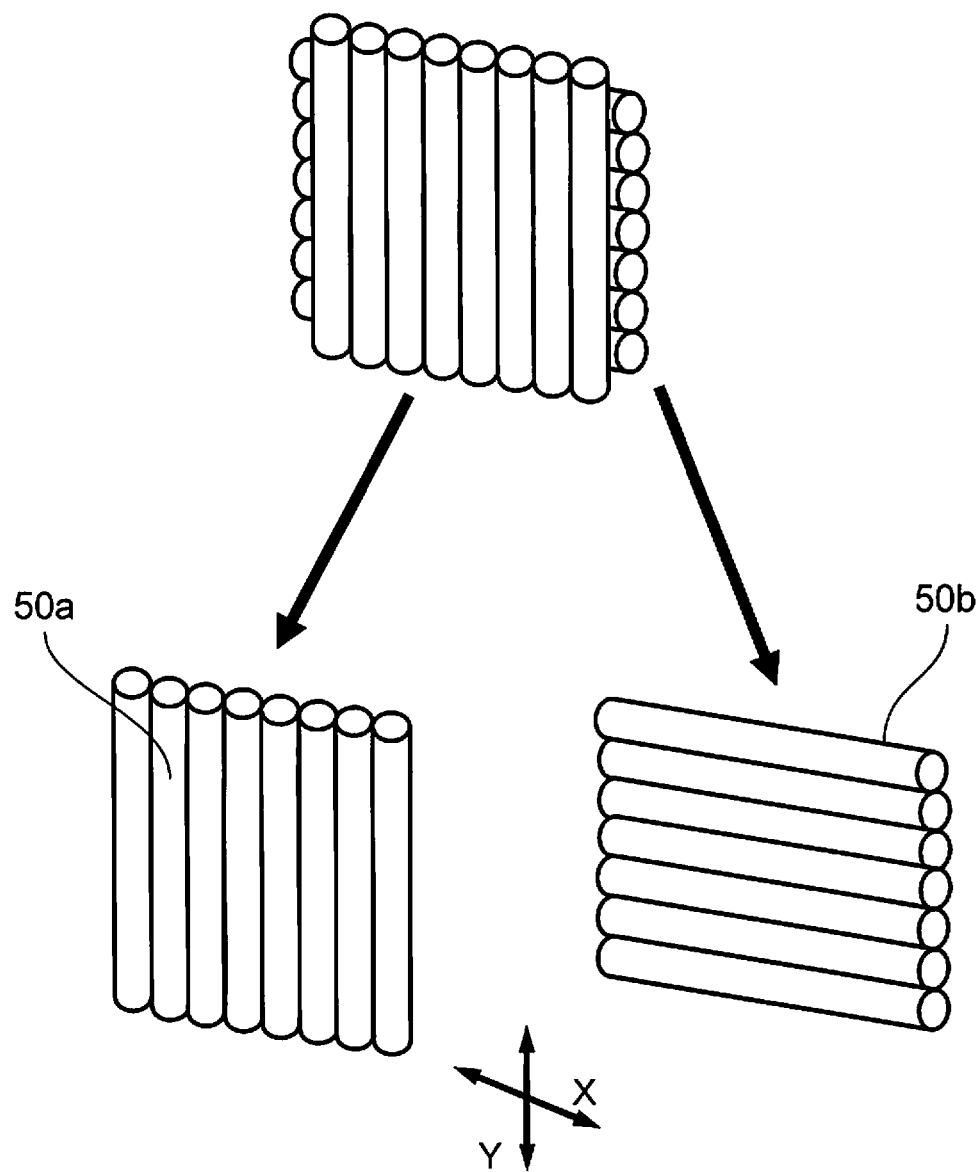
FIG. 9 is an explanatory diagram showing a diffusion optical element that is configured from two types of lenticular lenses.

Note that, here, the diffusion optical element 13 is preferably configured from two lenticular lenses, and the axes of the two lenticular lens are orthogonal. FIG. 9 is a diagram showing the lenticular lens 50 configured from a lenticular lens 50a (first lenticular lens), and a lenticular lens 50b (second lenticular lens). The lenticular lens 50a spreads the light in the direction (X direction) that is orthogonal to the axis direction of the lenticular lens 50a, and the lenticular lens 50b spreads the light in the direction (Y direction) that is orthogonal to the axis direction of the lenticular lens 50b. Here, since the light that enters the lenticular lenses 50a, 50b only spreads in the X direction and the Y direction, the light that enters as linear polarized light is output as linear polarized light, and it is possible to inhibit the disturbance of the polarized light. Thus, it is possible to cause linear polarized light to enter the liquid crystal display panel 15c, and realize an image display apparatus 10 with high light use efficiency and low power consumption.

Figure 10:
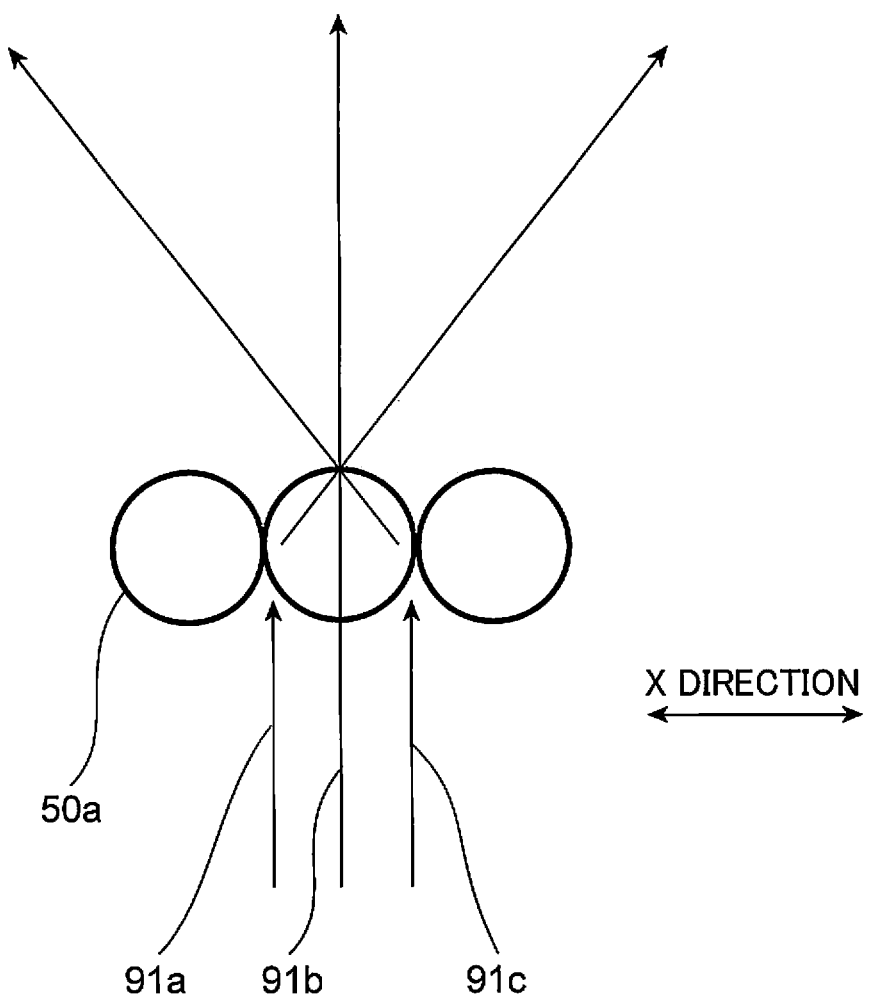
FIG. 10 is an enlarged view of the relevant part schematically showing the lenticular lens.

Preferably, the drive unit 14 drives the lenticular lens 50a in the X axis direction (axis direction of the lenticular lens 50b) with an amplitude of one pitch length of more of the lenticular lens 50a. FIG. 10 is a diagram in which the lens of the lenticular lens 50a is enlarged and viewed from the Y axis direction. The lenticular lens 50a, as shown in FIG. 10, refracts and diffuses the incident beams 91a, 91b, 91c. If the lenticular lens 50a moves in the X axis direction, the surface of the lenticular lens 50a to which the incident beams 91a, 91b, 91c enter will also move. Thus, the locus in which the respective incident beams refract and diffuse will change. Here, if the lenticular lens 50a moves one pitch or more of the lenticular lens 50a, the number of loci in which the incident beams refract and diffuse can be increased sufficiently. The number of loci in which the incident beams diffuse being sufficiently great means that the number of speckle patterns will also increase, and that the speckle noise can be further reduced. Thus, as a result of moving the lenticular lens 50 a length that is greater than the one pitch of the lenticular lens 50a, it is possible to realize an image display apparatus 10 with further reduced speckle noise.

Note that if the lenticular lens 50 is to be moved in the Y axis direction, similarly, the lenticular lens 50b is preferably driven in the Y axis direction (axis direction of the lenticular lens 50a) with an amplitude of one pitch length or more of the lenticular lens 50b.

Moreover, if the lenticular lens 50 is to be moved in two axis directions of the X axis and the Y axis, similarly, it should be moved one pitch or more of the lenticular lens 50a in the X axis direction and one pitch or more of the lenticular lens 50b in the Y axis direction.

In the laser light source 12, for example, a high output semiconductor laser is used as the R light source 12R for outputting the R light 11R with a wavelength of 640 nm and the B light source 12B for outputting the B light 11B with a wavelength of 445 nm, and a high output SHG laser based on semiconductor laser excitation is used as the light source 12G for outputting the G light 11G with a wavelength of 532 nm. Since a laser beam 11 with a narrow spectrum width is used as described above, it is possible to realize an image display apparatus 10 with superior color reproducibility.

Note that, since the light that is output from the high output SHG laser based on semiconductor excitation is generally a parallel light beam, by adopting the foregoing configuration, it is possible to eliminate the collimated lens 12c for causing the G light to become parallel light, and the cost of the image display apparatus 10 can be reduced.

(Second Embodiment)

Figure 11:
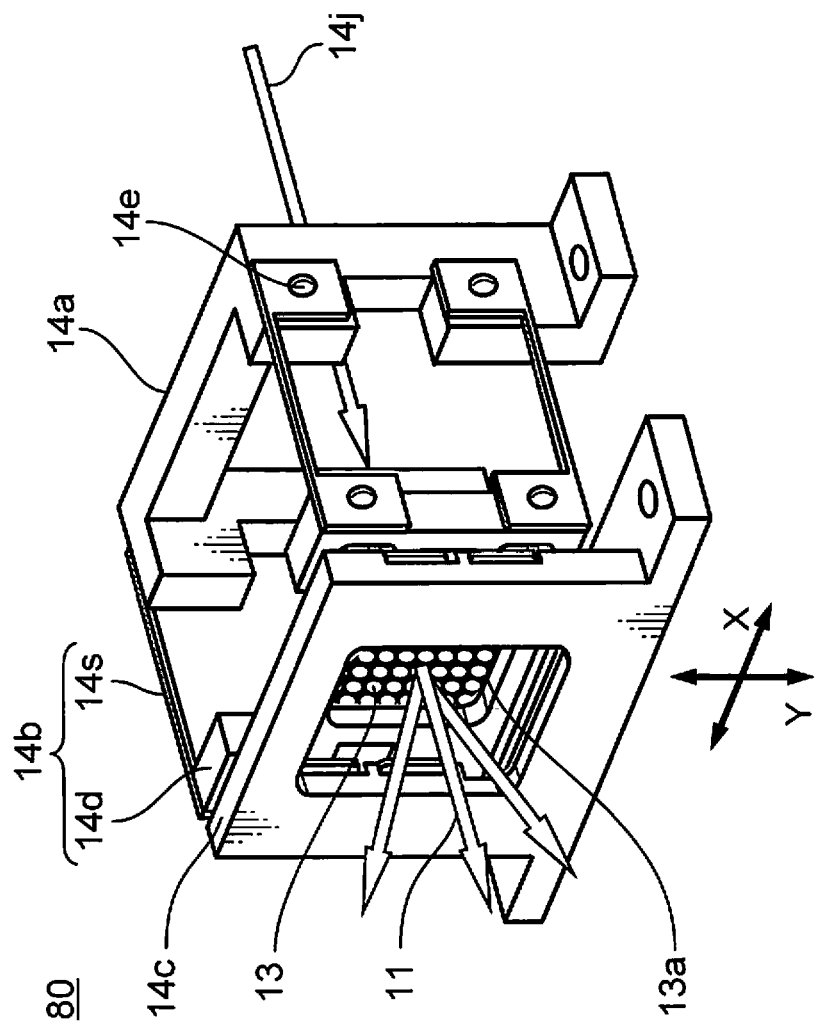
FIG. 11 is a perspective view showing an example of the drive unit that is used in the image display apparatus according to another embodiment of the present invention.

FIG. 11 is a perspective view of the drive unit 80 of the image display apparatus according to the second embodiment of the present invention.

Figure 12:
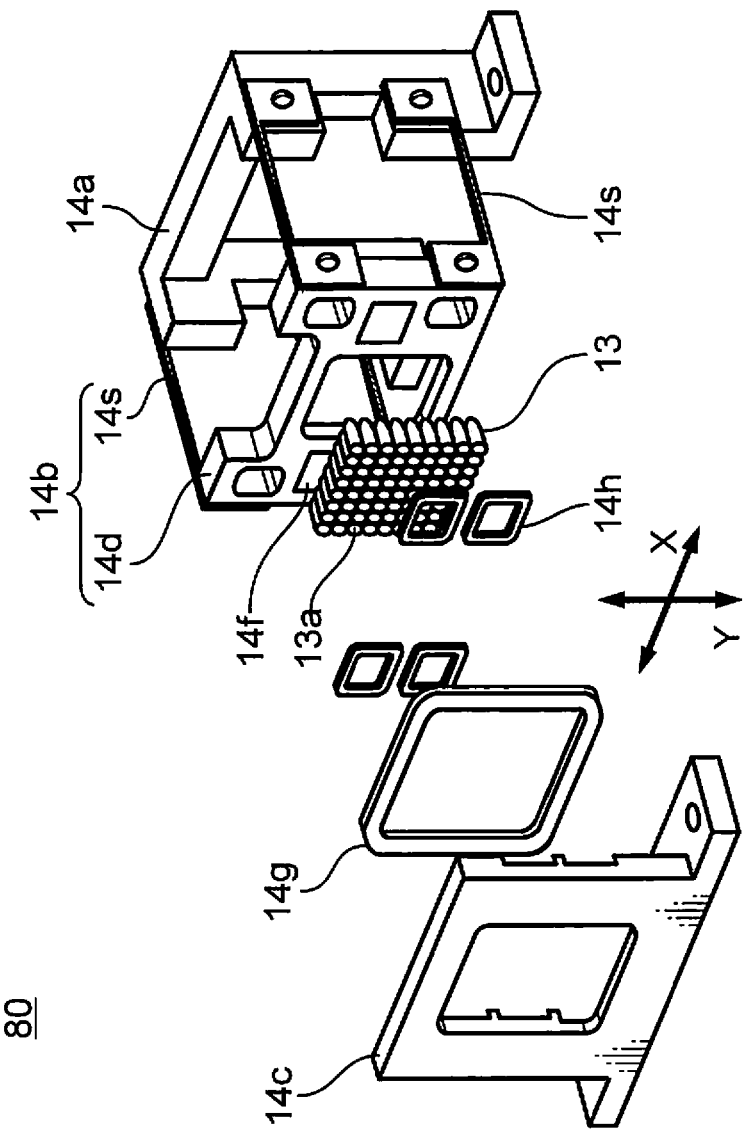
FIG. 12 is an exploded perspective view of the drive unit of FIG. 11.

FIG. 12 is a diagram showing an exploded perspective view of the drive unit 80. The configuration of the image display apparatus according to the second embodiment is the same as the configuration shown in FIG. 1 other than the drive unit, and the drive unit 14 of the first embodiment is replaced with the drive unit 80.

As shown in FIG. 11 and FIG. 12, the drive unit 80 is configured by including a base 14a, a moving part 14b for driving the diffusion optical element 13 to oscillate freely in the two axis directions of the arrow X and the arrow Y, and a stopper base 14c. The diffusion optical element 13 is mounted on a holder 14d configuring the moving part 14b, and fixed to a fixing part 14e with one end of four suspensions 14s; for example, wires formed from a material such as copper. A magnet 14f is fitted into and fixed to the holder 14d, and one X axis direction coil 14g and four Y axis coils 14h are fixed to the stopper base 14c at their respective positions. The coils 14g, 14h are able to apply current, and the flux of electromagnetic induction resulting from the applied current interacts with the magnetic field that is generated with the magnet 14f. Consequently, the moving part 14b is moved and oscillated, with the diffusion optical element 13 mounted thereon, in the directions of the arrow X and the arrow Y. For example, as a result of the holder 14d oscillating in the waveform of a sine wave in the X axis and the Y axis, its locus will become a Lissajous curve. In the case of this configuration, the Lissajous curve is the locus created on the XY plane.

According to the foregoing configuration, the drive unit 80 is able to oscillate the diffusion optical element 13 in the directions of the arrow X and the arrow Y. Thus, it is possible to enlarge the area of the diffusion optical element 13 which the laser beam passes through, increase the number of speckle patterns observed per unit time, and realize a compact image display apparatus 10 with sufficiently reduced speckle noise.

Figure 13:
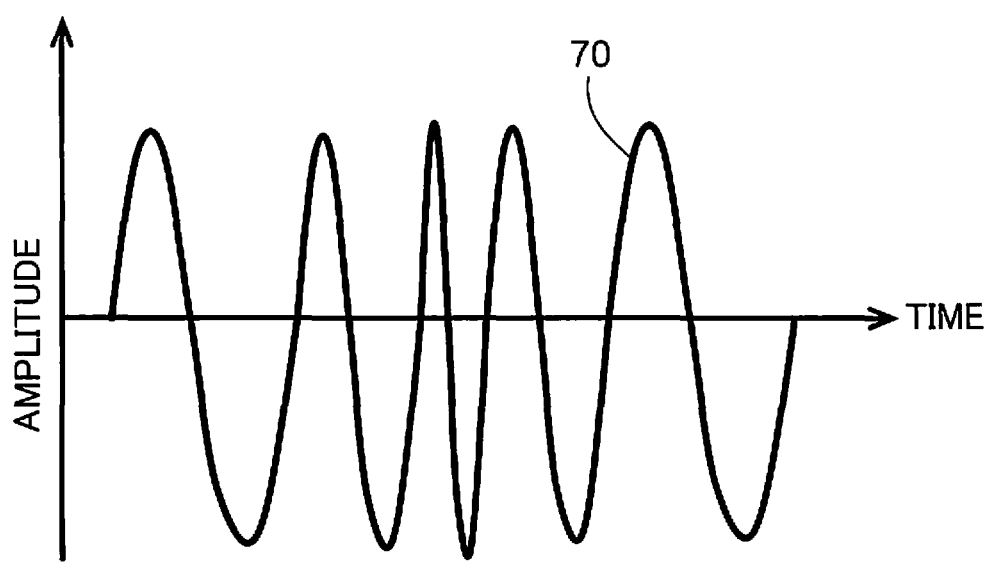
FIG. 13 is a waveform diagram showing a current waveform of the drive signal in the X axis direction subject to FM modulation.
Figure 14:
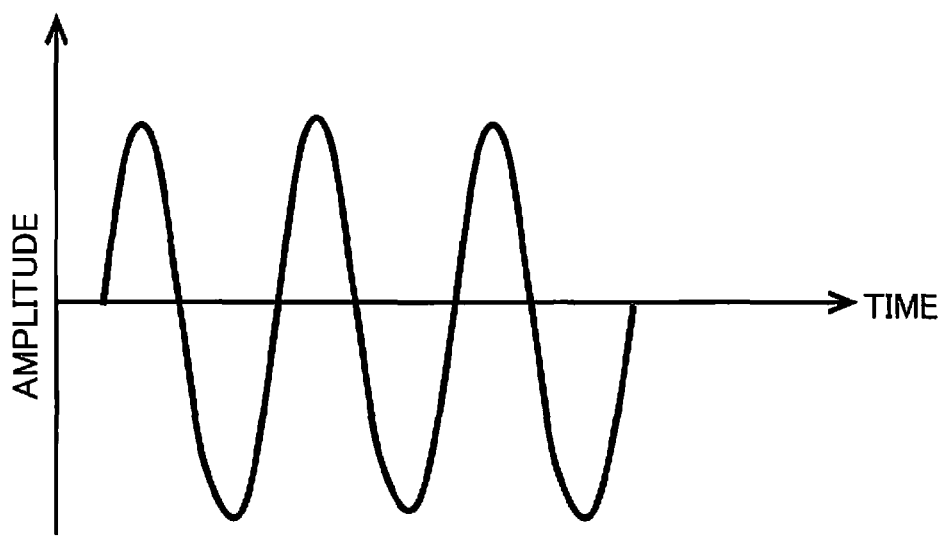
FIG. 14 is a waveform diagram showing a current waveform of the drive signal in the Y axis direction.
Figure 15:
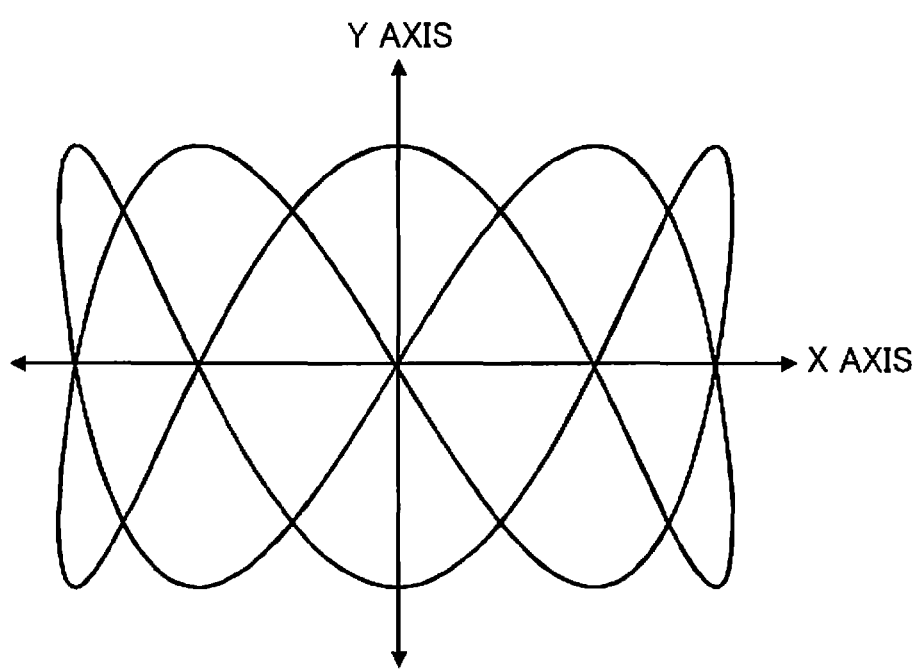
FIG. 15 is an explanatory diagram showing an example of the locus of the Lissajous curve.

The drive signal of the drive unit 80 according to this embodiment is now specifically explained. FIG. 13 is a diagram showing a current waveform of the drive signal that is being applied to the X axis coil 14g. In the current waveform 70, the frequency is temporally changing. Moreover, FIG. 14 is a diagram showing a current waveform of the drive signal that is being applied to the Y axis coil 14h. The Lissajous curve is a curve that is decided based on the frequency of the X axis, frequency of the Y axis, and their phases. Thus, as shown in FIG. 13, if modulation (hereinafter referred to as the "FM modulation") for changing the frequency is added to the current waveform of the drive signal applied to the X axis coil 14g, as shown with the example of FIG. 15, the locus of the Lissajous curve will change momentarily. By performing the drive with a frequency that is not constant; that is, by performing the drive based on FM modulation, the position of the diffusion optical element 13 will change and the randomness of the speckle pattern can be increased. Consequently, it is possible to realize an image display apparatus 10 with sufficiently reduced speckle noise and low power consumption.

Note that, as shown in FIG. 14, even if the FM modulation is not performed to the drive signal applied to the Y axis coil 14h, if the FM modulation is performed to the drive signal applied to the X axis coil 14g as shown in FIG. 13, the locus of the Lissajous curve will change. Specifically, it will suffice to perform the FM modulation to at least one axis. However, by performing the FM modulation to the Y axis in addition to the X axis, the randomness of the speckle pattern can be increased, and the speckle noise can be further reduced. Moreover, even by performing the FM modulation only to the Y axis and not performing the FM modulation to the X axis, the locus of the Lissajous curve will change, and the effect of reducing the speckle noise can be obtained.

In addition, it is also possible to perform the FM modulation to one axis of either the X axis or the Y axis, and perform the AM modulation to the other axis.

Note that, in substitute for the FM modulation, the phase of the current waveform 70 may be temporally changed. As a result of changing the phase, since the Lissajous curve will change, the same effect as the FM modulation is yielded.

(Third Embodiment)

The image display apparatus according to the third embodiment of the present invention is now explained. The image display apparatus according to the third embodiment is the same as the image display apparatus according to the second embodiment other than the drive signal of the drive unit 80.

Figure 16A:
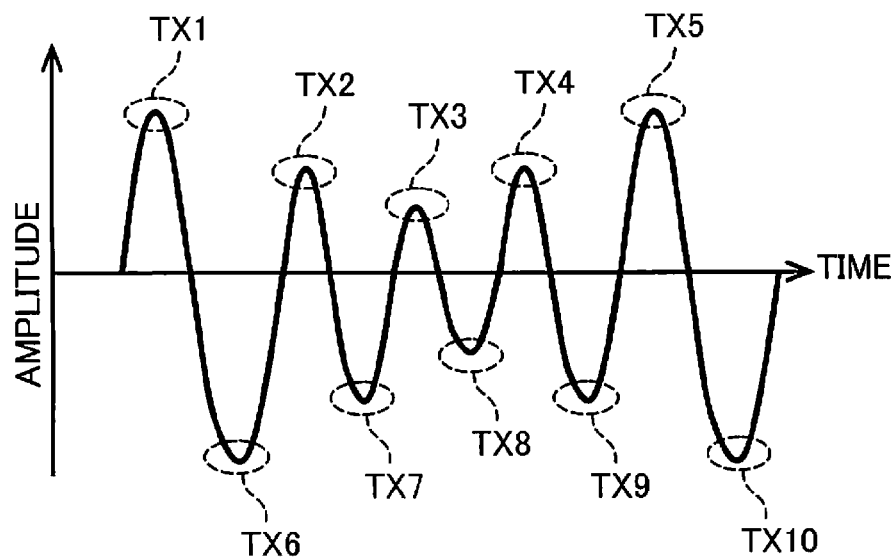
FIG. 16A is an explanatory diagram showing that the drive in the X axis direction is subject to AM modulation.
Figure 16B:
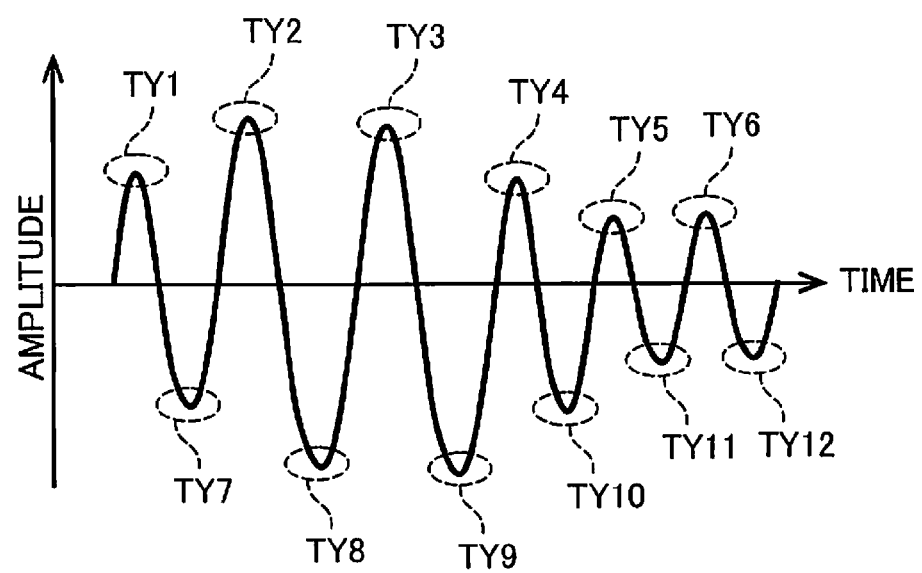
FIG. 16B is an explanatory diagram showing that the drive in the Y axis direction is subject to AM modulation.

The drive unit 80 of the image display apparatus according to the third embodiment oscillates the holder 14d based on AM modulation. FIG. 16A and FIG. 16B are diagrams showing that the diffusion optical element 13 is driven based on AM modulation in the respective directions of the arrow X and the arrow Y. Here, FIG. 16A is a diagram showing the AM modulation being performed for driving in the direction of the arrow X. Meanwhile, FIG. 16B is a diagram showing the AM modulation being performed for driving in the direction of the arrow Y.

As shown in FIG. 16A, if the AM modulation is performed in the direction of the arrow X, the speckle patterns SX1, SX2, SX3, SX4, SX5 and SX6, SX7, SX8, SX9, SX10 in the maximum points TX1, TX2, TX3, TX4, TX5 and the minimum point TX6, TX7, TX8, TX9, TX10 of the respective amplitudes of the drive in the direction of the arrow X will be respectively different, and the randomness of the speckle pattern can thereby be increased. Consequently, it is possible to realize the image display apparatus 10 with sufficiently reduced speckle noise and low power consumption.

Similarly, as shown in FIG. 16B, if the AM modulation is performed in the direction of the arrow Y, the speckle patterns SY1, SY2, SY3, SY4, SY5, SY6 and SY7, SY8, SY9, SY10, SY11, SY12 at the maximum points TY1, TY2, TY3, TY4, TY5, TY6 and the minimum points TY7, TY8, TY9, TY10, TY11, TY12 of the respective amplitudes of the drive in the direction of the arrow Y will be respectively different, and the randomness of the speckle pattern can thereby be increased. Consequently, it is possible to realize the image display apparatus 10 with sufficiently reduced speckle noise and low power consumption.

Note that if the AM modulation is performed to the drive signal, the second frequency 60b for modulating the oscillation amplitude preferably has the same frequency and different phase in the X axis and the Y axis. Since the oscillation amplitude is small in the one cycle where the oscillation amplitude becomes minimum, the area where the laser beam passes through the diffusion optical element 13 will become smaller than the case of other cycles, and the speckle noise may become conspicuous. If the phase of the drive signal is different in the X axis and the Y axis, it is possible to prevent the oscillation amplitudes of the X axis and the Y axis from becoming minimum simultaneously, and it is thereby possible to reduce the speckle noise.

Note that, more preferably, the second frequency 60b has the same frequency in the X axis and the Y axis, but with a phase that is misaligned by a half cycle. Consequently, the oscillation amplitude of the Y axis will become maximum when the oscillation amplitude of the X axis is minimum, and, contrarily, the oscillation amplitude of the Y axis will become minimum when the oscillation amplitude of the X axis is maximum. Since one will become the maximum oscillation amplitude when the other is the minimum oscillation amplitude, it is possible to further prevent the speckle noise of a cycle with a small oscillation amplitude from becoming conspicuous.

Note that, even in cases where only the FM modulation is performed to the drive of the actuator of the drive unit 14, if the drive is being conducted mainly with the resonance frequency, the AM modulation is also being performed as the operation of the actuator since the gain of the actuator will considerably change depending on the frequency, and it is thereby possible to further reduce the speckle noise.

As shown in the first embodiment to the third embodiment described above, if the drive unit 14 or 80 for driving the diffusion optical element 13 of the image display apparatus is driven so that at least its amplitude or frequency is not constant, the randomness of the speckle pattern at the rest point of the diffusion optical element 13 can be increased, and a large indefinite number of speckle patterns can be created at the rest point. Consequently, it is possible to realize an image display apparatus with sufficiently reduced speckle noise. In addition, without using a large component such as a motor, since an actuator that is supported with a plurality of wires or the like can be driven by using the magnetic force of the magnet in the directions of two axes that are perpendicular to the optical axis and the magnetic field of electromagnetic induction, the configuration will suffice to provide space capable of disposing components of an optical system. Accordingly, it is possible to realize a small and compact image display apparatus.

(Fourth Embodiment)

The image display apparatus according to the fourth embodiment of the present invention is now explained. The image display apparatus according to the fourth embodiment differs from the image display apparatus according to the first embodiment in that the drive signals of the spatial modulation element 15b and the laser light source 12 and the drive unit 14 are synchronized, and the remaining configuration is the same.

The image display apparatus 10 according to the fourth embodiment is a field sequential-type image display apparatus which drives the laser light source 12 and the spatial modulation element 15b in synchronization. A field sequential-type is a system of synchronizing the light with the single plate spatial modulation element 11B capable of high speed modulation, and lighting images of red, green and blue at a high speed. Since the images of RGB are superimposed at a high speed, the observer will recognize this as a color image.

Here, the laser light source 11 is driven in synchronization with the spatial modulation element 15b, and the drive unit 14 is also driven in synchronization with the spatial modulation element 15b. As described above, if the spatial modulation element 15b, the laser light source 11 and the drive unit 14 are driven in synchronization, it is possible to realize an image display apparatus with even less color unevenness or luminance unevenness with high efficiency. This is because the laser beam 11 that was multiplexed with the dichroic mirror 12d is spread with the diffusion optical element 13. Here, if the optical axes of the respective laser beams of RGB of the multiplexed laser beam 11 are misaligned, color unevenness may occur in the image to be projected. Although the color unevenness can be reduced by increasing the diffusivity of the diffusion optical element 13, the shading of the light will increase if the diffusivity is increased, and this will deteriorate the light use efficiency. Moreover, even if the optical axes of the respective laser beams of RGB of the multiplexed laser beam 11 are the same, if the diffusivity of the diffusion optical element 13 is low, luminance unevenness may occur in the image. As described above, if the luminance unevenness or color unevenness occurs, the distribution of the color unevenness or luminance unevenness of the image will change depending on the position of the diffusion optical element 13. In the foregoing case, if there is a gap between the drive cycle of the actuator of the drive unit 14 and the cycle of the field sequential, there are cases where the beat of color or brightness becomes visible. Thus, in order to realize high light use efficiency and inhibit the generation of luminance unevenness or color unevenness, it is preferable to drive the spatial modulation element 15b, the laser light source 11 and the drive unit 14 in synchronization.

Figure 17:
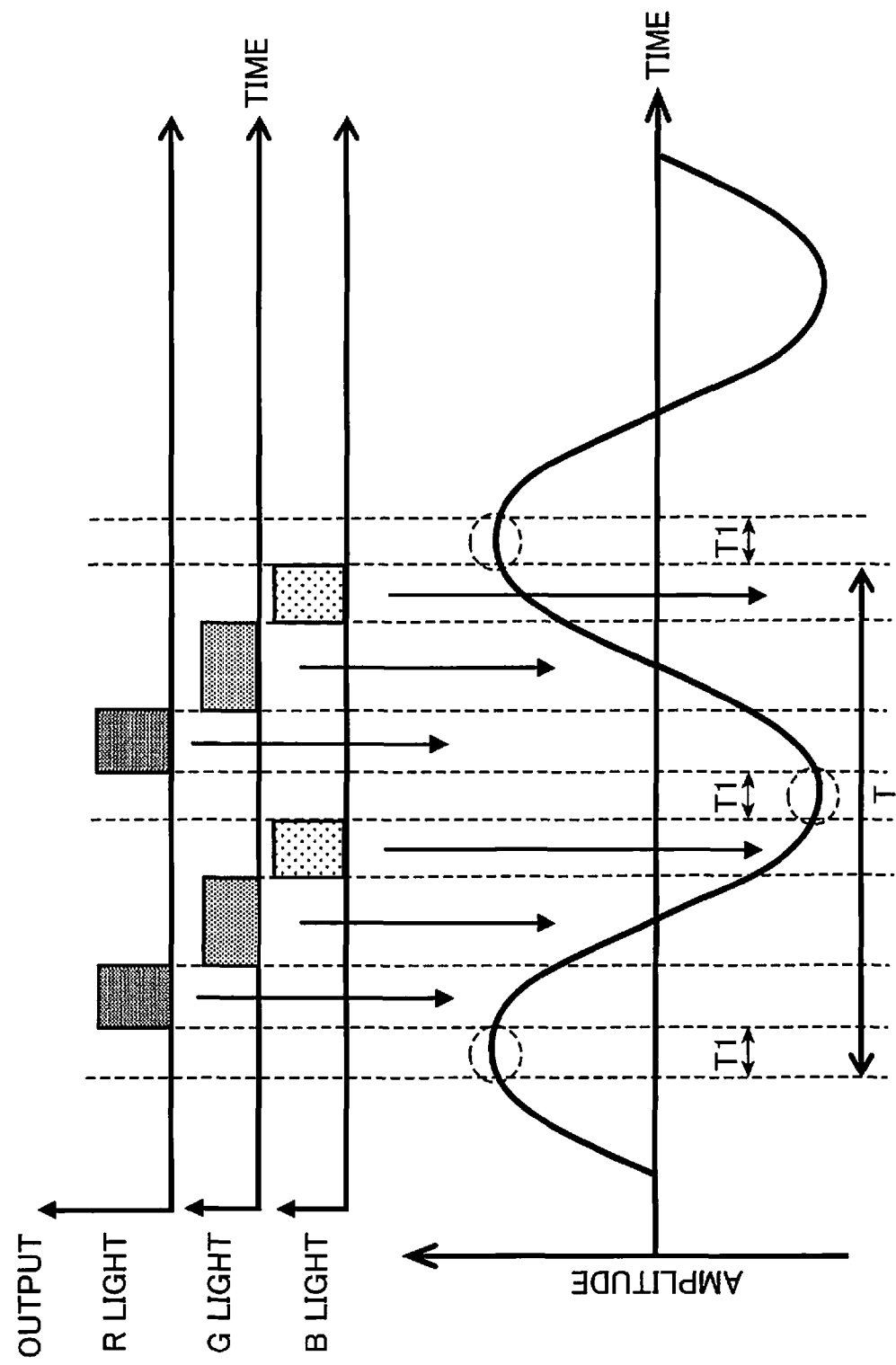
FIG. 17 is an explanatory diagram showing the status of the moving part and the timing of lighting the laser light source.

The drive signal of the drive unit 14 is now specifically explained. FIG. 17 is a diagram showing the status of the moving part 14b and the timing of lighting the laser light source 11. The time domain T1 of FIG. 17 is the same time domain as T1 of FIG. 7. The laser light source 12 is configured so that it will not output the laser beam 11 in a predetermined time domain including the time domain T1 (first time domain) where the driving speed of the moving part 14b becomes zero. As shown in FIG. 17, none of the laser beams 11 of the R laser beam 11R, the G laser beam 11G and the B laser beam 11B will enter the spatial modulation element 15b in the foregoing case, and the laser light source 12 is suspending its emission. As a result of adopting the foregoing configuration, it is possible to display images upon eliminating the speckle noise of the time domain T1, and obtain images with further reduced speckle noise.

Figure 18:
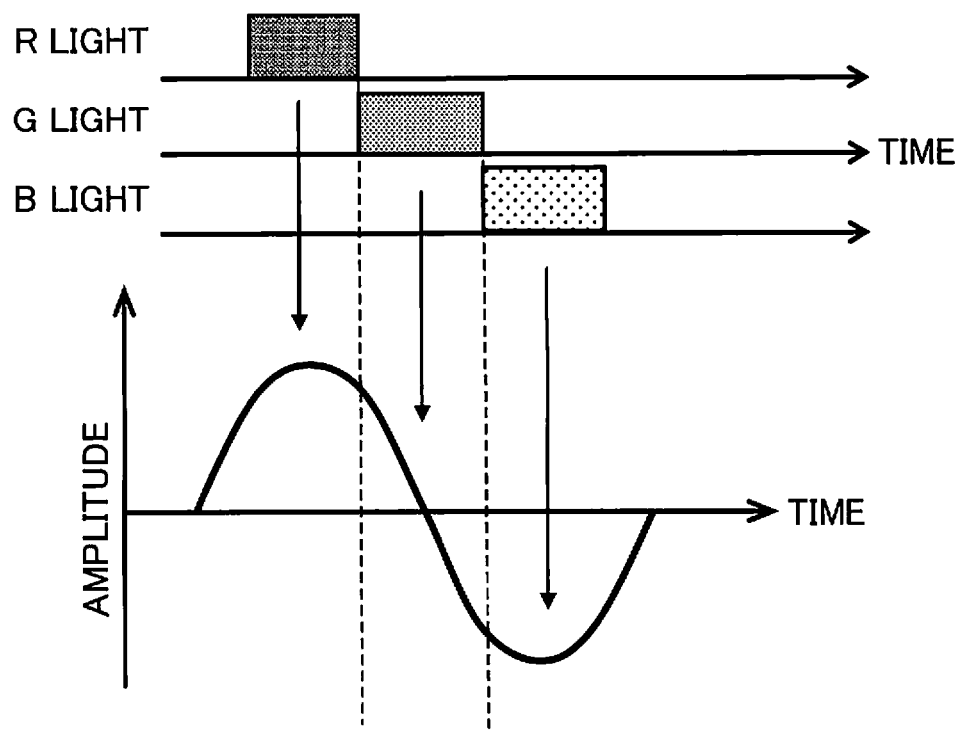
FIG. 18 is an explanatory diagram showing that the amplitude of the moving part is being subject to simple harmonic oscillation in relation to the time axis, and that the RGB laser beam is temporally divided into three parts and input into the drive unit and the image conversion unit in correspondence to one cycle of the foregoing oscillation.

Moreover, in order to realize a high intensity image display apparatus, in the conditions described later, any one of the laser beams 11 of the R laser beam 11R, the G laser beam 11G and the B laser beam 11B may constantly emit light. FIG. 18 is an explanatory diagram showing that the amplitude of the moving part 14b is constant and oscillating in a waveform of a sine wave in relation to the time axis, and that the RGB laser beam is temporally divided into three parts and input into the drive unit 14 and the image conversion unit 15 in correspondence to one cycle of the foregoing oscillation. As shown in FIG. 18, the R laser beam 11R or the B laser beam 11B emits light when the amplitude of the moving part 14b is maximum. Moreover, the G laser beam 11G includes a point where the speed of the diffusion optical element 13 mounted on the moving part 14b becomes maximum. In other words, the speckle pattern of the rest point of the diffusion optical element 13 is created based on the R laser beam 11R and the B laser beam 11B. Various speckle patterns of the G laser beam 11G can be created by moving the diffusion optical element 13 at high speed. The G laser beam 11G has higher visibility in comparison to the R laser beam 11R and the B laser beam 11B, and the observer will particularly recognize the speckle noise created with the G laser beam 11G. Thus, if the speckle pattern created with the G laser beam 11G is created varyingly, it is possible to reduce the speckle noise of the overall image observed by the observer, and obtain a favorable image display apparatus.

Moreover, if the RGB laser light source is used as the laser light source 12, from the perspective of reliability and output, a high output semiconductor laser may be used as the R laser light source 12R and the laser light source 12B, and a high output SHG laser based on semiconductor laser excitation may be used as the G laser light source 12G. In the foregoing case, from the perspective of inhibiting the speckle noise, the R laser beam 11R and the B laser beam 11B from a semiconductor laser with a relatively wide spectral line width of approximately 0.2 nm are caused to enter at the time domain T1 in which the amplitude of the moving part 14b is minimum or maximum. In addition, the G laser beam 11G from the SHG laser with a narrow spectral line width of 0.01 nm is caused to enter at the time domain T2 in which the amplitude changes from maximum to minimum or from minimum to maximum. Specifically, the drive unit 14 is configured to periodically drive the diffusion optical element 13 mounted on the moving part 14b, and output the G laser beam 11G from the G laser light source 12G in a predetermined time domain including the time domain T2 where the driving speed of the moving part 14b becomes fastest.

Consequently, it is possible to reduce the speckle noise even when using the SHG laser, and realize a high resolution image display apparatus. This is because the intensity of the speckle noise inversely relates to the spectral line width of its light, and the SHG laser beam is caused to enter the diffusion optical element 13 at the time domain T2 where the amplitude changes considerably so as to significantly reduce the speckle noise of the SHG laser beam in which the intensity of the speckle noise will increase.

Note that the G laser light source 12G for outputting this kind of SHG laser beam comprises an infrared laser light source and a wavelength conversion element, and is configured to output the G laser beam 11G with a wavelength of 532 nm, which was subject to wavelength conversion with the wavelength conversion element based on the infrared laser beam output from the infrared laser light source. As a result of adopting the foregoing configuration, it is possible to display images by using the compact G laser beam 11G with superior high efficiency in a state where the speckle noise is sufficiently reduced.

(Fifth Embodiment)

Figure 19:
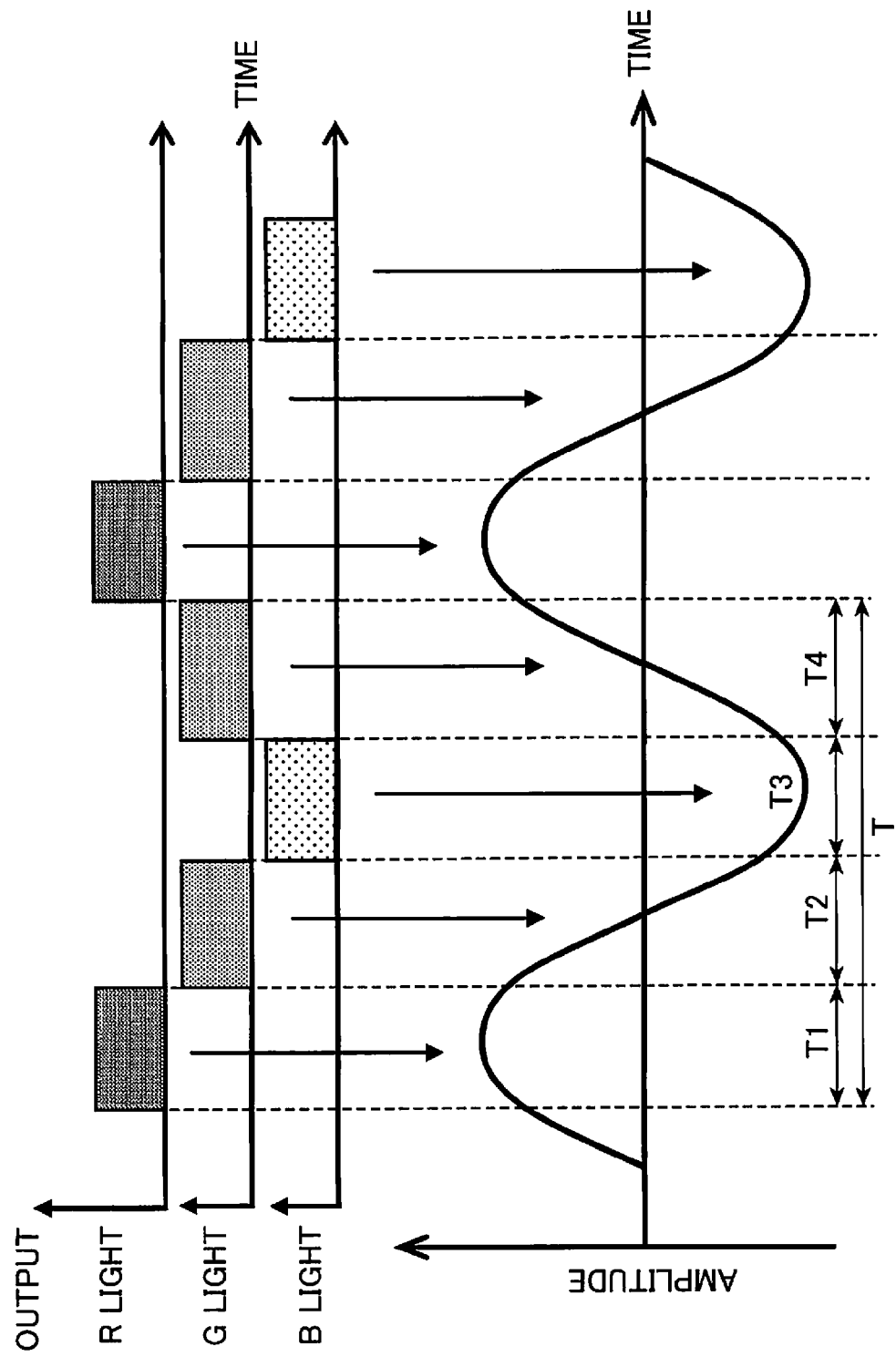
FIG. 19 is an explanatory diagram showing an example of the modulation pattern in the image display apparatus according to another embodiment of the present invention.

FIG. 19 is an explanatory diagram showing an example of the modulation pattern in the image display apparatus according to the fifth embodiment of the present invention. The configuration of the image display apparatus according to the fifth embodiment of the present invention is the same as the configuration of the image display apparatus according to the fourth embodiment, and is an image display apparatus with different modulation patterns of the drive signals of the spatial modulation element 15b and the laser light source 12 and the drive unit 14.

With the image display apparatus according to the fifth embodiment, as shown in FIG. 19, the configuration is such that the laser beam 11 is output from the laser light source 12 as a result of only the G laser light source 12G operating in two divided times T2, T4 (second time domain) among the divided times T1, T2, T3, T4 in which one cycle T, which the drive unit 14 periodically drives the moving part 14b, was divided into four parts, and the R laser light source 12R and the laser light source 12B being independently operated in the other two divided times T1, T3 (first time domain).

Here, T1 is the first time domain including the timing where the amplitude of the diffusion optical element 13 becomes maximum (timing in which the driving speed is zero), and includes a time domain where the temporal change of the interference pattern becomes zero. Moreover, T2 is the second time domain including the timing of passing through the center of the amplitude when the amplitude of the diffusion optical element 13 changes from maximum to minimum (timing in which the driving speed is fastest), and includes a time domain where the temporal change of the interference pattern becomes maximum. Moreover, T3 is the first time domain including the timing where the amplitude of the diffusion optical element 13 becomes minimum (timing in which the driving speed is zero), and includes a time domain where the temporal change of the interference pattern becomes zero. Moreover, T4 is the second time domain including the timing of passing through the center of the amplitude when the amplitude of the diffusion optical element 13 changes from minimum to maximum (timing in which the driving speed is fastest), and includes a time domain where the temporal change of the interference pattern becomes maximum.

According to the foregoing configuration, since the G laser beam 11G will additionally enter the spatial modulation element 15b where the driving speed of the moving part 14b is fastest, images can be displayed in a state with sufficiently reduced speckle noise.

Although a configuration of outputting the green laser beam in the second time domain including a time domain where the temporal change of the interference pattern becomes maximum and a configuration of outputting the green laser beam from the G laser light source 12G in two inconsecutive time domains T2, T4 among the time domains in which one cycle of the drive signal was divided into the four time domains of T1 to T4 were explained above, the present invention is not limited thereto. For example, the present invention can also be applied to cases of dividing the one cycle of the drive signal into more time domains. Specifically, the green laser beam may be output from the G laser light source 12G in at least two or more inconsecutive time domains among the time domains in which one cycle of the drive signal is divided into at least four or more time domains.

(Sixth Embodiment)

Figure 20:
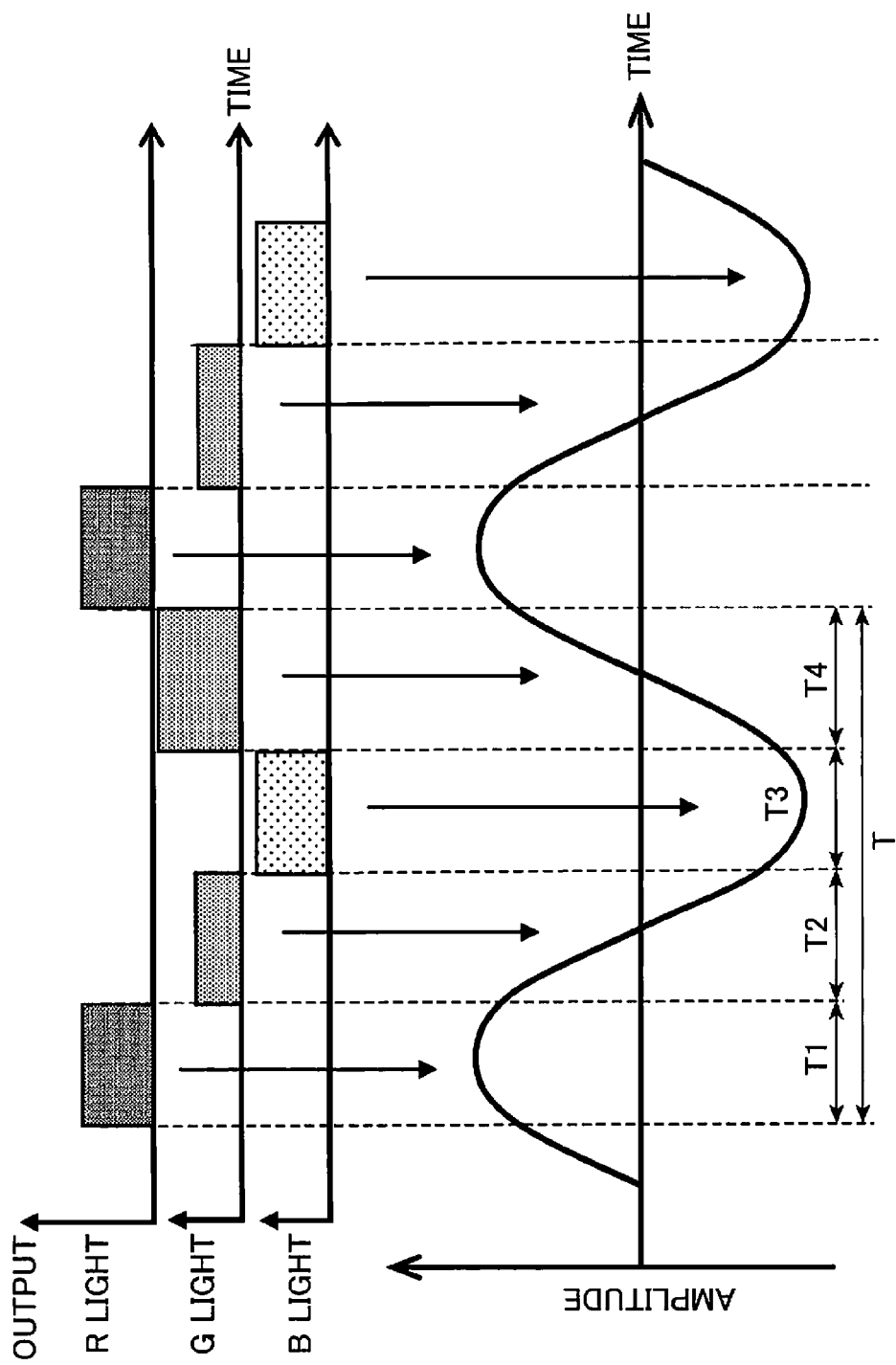
FIG. 20 is an explanatory diagram showing another example of the modulation pattern in the image display apparatus according to another embodiment of the present invention.

FIG. 20 is an explanatory diagram showing another example of the modulation pattern in the image display apparatus according to the sixth embodiment of the present invention. The configuration of the image display apparatus according to the sixth embodiment of the present invention is the same as the configuration of the image display apparatus according to the fifth embodiment, and is an image display apparatus with different output patterns of the G laser beam.

Moreover, with the image display apparatus according to the sixth embodiment, as shown in FIG. 20, the configuration is such that the optical output of the G laser beam 11G that is output from the G laser light source 12G in the two divided times T2, T4 is of a different output value in the respective divided times T2 and T4. The G laser light source 12G is an internal resonator-type SHG laser which excites a solid laser crystal, for example, with an infrared semiconductor laser with a wavelength of 808 nm, configures a resonator with the solid laser crystal and a mirror disposed outside, and has a wavelength conversion element inserted therein. YVO4 or the like doped with Nd is used as the solid laser crystal. As a result of configuring the resonator with the solid laser and a mirror disposed on the outside, generating laser with a wavelength of 1064 nm, and having a wavelength conversion element inserted therein, the laser with a wavelength of 1064 nm is converted into a G laser beam with a wavelength of 532 nm and output. This kind of internal resonator-type G laser is characterized in that the lateral mode (intensity distribution of the cross section of the beam) changes according to the output.

Thus, as a result of adopting the foregoing configuration, the lateral mode of the G laser beam 11G in T2 and the lateral mode of the G laser beam 11G in T4 will differ, and the coherency between the G laser beams will deteriorate. Accordingly, it is possible to even more effectively reduce the speckle noise.

(Seventh Embodiment)

Figure 21:
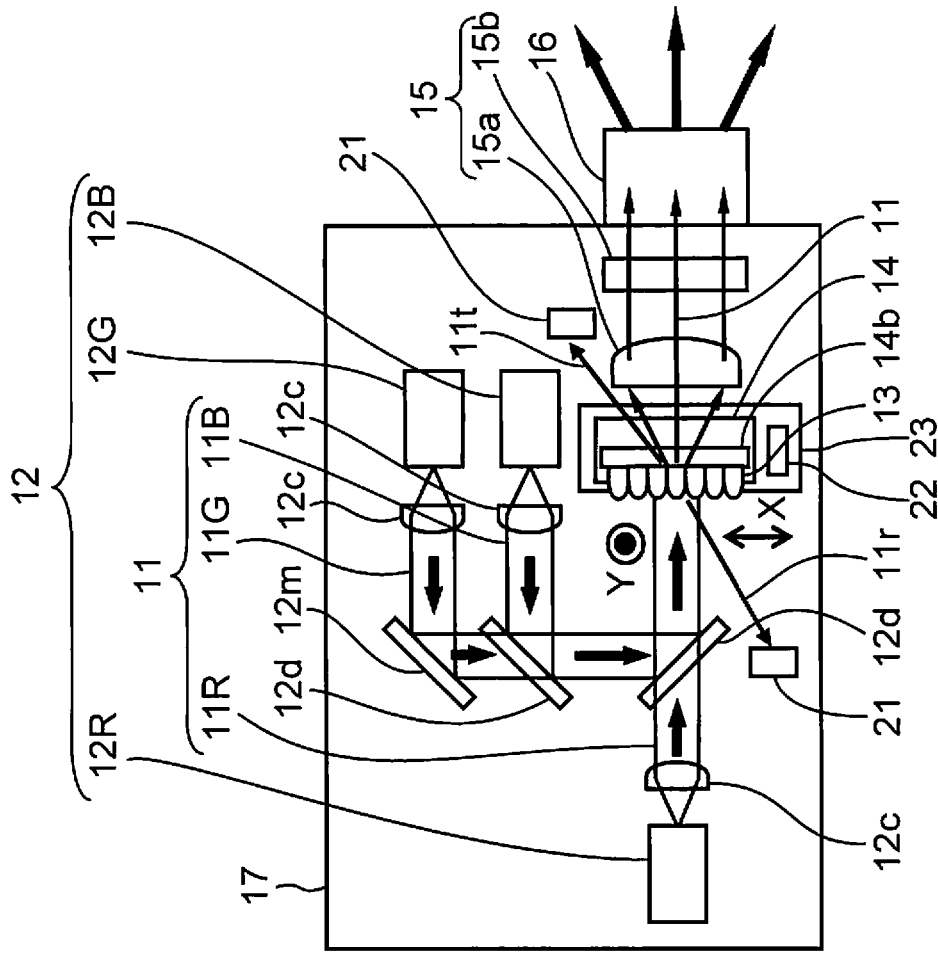
FIG. 21 is a plan view showing a schematic configuration of the image display apparatus according to another embodiment of the present invention.

FIG. 21 is a plan view showing a schematic configuration of the image display apparatus 20 according to the seventh embodiment of the present invention.

As shown in FIG. 21, the image display apparatus 20 of the seventh embodiment comprises, as with the image display apparatus 10 of the first embodiment, a laser light source 12 including at least a green laser light source 12G for outputting the laser beam 11, a diffusion optical element 13 for diffusing the laser beam 11, a drive unit 14 including a moving part 14b for supporting and oscillating the diffusion optical element 13, and an image conversion unit 15 including a spatial modulation element 15b for converting the laser beam 11 that was output from the diffusion optical element 13 into an image. The drive unit 14 of the image display apparatus 10 is configured to drive the moving part 14b in synchronization with the modulation operation of the spatial modulation element 15b.

Unlike the image display apparatus 10 of the first embodiment, the image display apparatus 20 of the seventh embodiment comprises, as shown in FIG. 21, at least an optical detector 21 for detecting the oscillation or positional change of the drive unit 14, or a monitor coil 22.

Specifically, the drive unit 14 may further comprise the optical detector 21, and be configured to detect changes in the distance between the drive unit 14 and the optical detector 21 by detecting a part of the reflected light 11r from the diffusion optical element 13 or the transmitted light 11t that passes through the diffusion optical element 13. The optical detector 21 may use a quartered optical element such as an optical pickup that is used for detecting a focal error signal and detect changes in the distance based on changes in the beam shape or light quantity in the optical element.

According to the foregoing configuration, the speckle noise can be further reduced effectively since the timing of emitting the laser beam 11 to enter the spatial modulation element 15b can be decided by detecting changes in the oscillation or position of the drive unit 14.

Moreover, the drive unit 14 may further comprise a base 23 and a monitor coil 22, and be configured such that the monitor coil 22 electromagnetically detects changes in the position of the moving part 14b that is fixed to the base 23 and periodically driven.

According to the foregoing configuration, as with the case of detection using the optical detector 21, changes in the oscillation or position of the drive unit 14 can be detected with accuracy by detecting the change in the size of the current value based on the electromagnetic induction flowing in the monitor coil 22. Consequently, the speckle noise can be further reduced effectively since the timing of emitting the laser beam 11 to enter the spatial modulation element 15b can be decided with accuracy.

As shown in the fourth embodiment to the seventh embodiment explained above, as a result of adopting the configuration where the drive unit 14 for driving the diffusion optical element 13 of the image display apparatus drives the resonant actuator in synchronization with the modulation operation of the spatial modulation element 15b, and the laser light source 12 causes laser beams with different wavelengths to enter the diffusion optical element 13 and the spatial modulation element 15b in synchronization with the modulation operation of the spatial modulation element 15b, it is possible to effectively reduce the speckle noise in the G laser beam, which has high visibility and easily generates speckle noise, and realize an image display apparatus capable of displaying high quality images.

Moreover, without using a large component such as a motor, since an actuator that is supported with a plurality of wires or the like can be driven by using the magnetic force of the magnet in the direction of at least one axis that is perpendicular to the optical axis and the magnetic field of electromagnetic induction, the configuration will suffice to provide space capable of disposing components of an optical system. Accordingly, it is possible to realize a small and compact image display apparatus.

Note that the configurations shown in the foregoing embodiments of the present invention are merely examples, and this invention can be worked in various modifications so as long as it does not deviate from the gist of this invention.

For example, the light source is not limited to a laser light source, and it will suffice so as long as at least one light source with high coherency is included. As a light source other than a laser light source, used may be, for instance, an LED.

Moreover, without limitation to an RGB laser light source, a yellow laser light source may also be included. As a result of using a yellow laser light source, the range of color reproducibility can be further broadened. When including a yellow laser light source, the emission timing of the laser light source and the drive unit 14 can be synchronized appropriately based on the visibility and spectrum width in the fourth embodiment to the seventh embodiment.

Moreover, the interference pattern changing optical element is not limited to the diffusion optical element 13. The interference pattern changing optical element will suffice so as long as it is able to reduce the coherency of light temporally or spatially, and, for example, a liquid crystal element or a depolarization element may also be used. A laser beam may be transmitted through the liquid crystal element to change the refractive index portion by portion and shift the phase to reduce the coherency, or a laser beam may be transmitted through the depolarization element to disturb the polarized light of the laser beam to reduce the coherency.

Moreover, the drive unit will suffice so as long as it includes an oscillation unit, and is not limited to an actuator that uses the interaction of electromagnetic induction. For example, the drive unit may also be an actuator that uses the piezoelectric effect or the electrostatic effect.

Moreover, the spatial modulation element is not limited to a transmissive liquid crystal panel, and will suffice so as long as it is able to modulate light according to an image signal. For example, the spatial modulation element may be a reflective liquid crystal panel, DMD (trademark of US-based Texas Instruments), or an element that displays images by using a scanning mirror.

As described above, the image display apparatus according to one aspect of the present invention includes: a light source for outputting light to be used for display; an interference pattern changing optical element for temporally changing an interference pattern that is formed with the light; a drive unit for driving and oscillating the interference pattern changing optical element; and an image conversion unit for converting the light into an image, wherein an amplitude or a frequency of a drive signal of the drive unit is not temporally constant.

According to the foregoing configuration, light that is output from the light source passes through the interference pattern changing optical element which is oscillated and driven by the drive unit, and converted into an image by the image conversion unit and used for display. Here, as a result of the amplitude of the drive signal not being temporally constant or the frequency of the drive signal not being temporally constant in the drive unit which drives the interference pattern changing optical element, the amplitude of the physical oscillation of the interference pattern changing optical element will temporally change.

Specifically, as a result of the amplitude of the drive signal not being constant, the speckle pattern that is formed with the interference pattern changing optical element when the amplitude of the interference pattern changing optical element is maximum will temporally change. Consequently, it is possible to realize a compact image display apparatus capable of inhibiting the speckle pattern when the amplitude of the interference pattern changing optical element is maximum from becoming accentuated, and displaying high quality images with reduced speckle noise.

Moreover, as a result of the frequency of the drive signal not being constant also, the speckle pattern that is formed with the interference pattern changing optical element when the amplitude of the interference pattern changing optical element is maximum will temporally change. This is because, with the drive unit, the gain changes in accordance with the frequency of the drive signal. More specifically, since the gain becomes smaller as the frequency of the drive signal departs from the resonance frequency of the oscillation system of the drive unit, if the frequency of the drive signal changes, the amplitude of the physical oscillation of the interference pattern changing optical element will also temporally change. Consequently, it is possible to realize a compact image display apparatus capable of inhibiting the speckle pattern when the amplitude of the interference pattern changing optical element is maximum from becoming accentuated, and displaying high quality images with reduced speckle noise. Moreover, if the drive unit includes a plurality axes for performing oscillation and driving, as a result of changing the frequency of the drive signal, it is possible to change the temporal locus of the interference pattern changing optical element. Thus, since the speckle pattern will become random in comparison to cases of drawing a constant locus, it is possible to realize a compact image display apparatus capable of displaying images with reduced speckle noise.

In the foregoing configuration, preferably, the frequency of the drive signal of the drive unit is 30 Hz or higher.

As described above, by setting the frequency of the drive signal to be 30 Hz or higher, the speckle pattern can be changed sufficiently quicker than the temporal resolution of a human eye, and it is thereby possible to obtain high quality images with sufficiently reduced speckle noise.

Moreover, preferably, the drive signal of the drive unit is formed by superimposing a plurality of signals of different frequencies.

As a result of superimposing a plurality of signals of different frequencies as described above, an arbitrary drive signal subject to AM modulation can be easily generated.

Moreover, preferably, the light source is a laser light source for outputting a laser beam as the light to be used for display.

Since a laser light source is close to an ideal point light source, it is easy to form a parallel light beam or collect light. Thus, the light to be used for display can be efficiently used, and the power consumption of the image display apparatus can be suppressed. Moreover, since a compact optical system can be realized by using a laser light source, a compact image display apparatus can be realized.

In the foregoing configuration, preferably, the interference pattern changing optical element is a diffusion optical element.

The diffusion optical element is used for uniformizing the intensity distribution of the light beam (laser beam or the like) and enlarging the beam area. Thus, the beam diameter of the light that enters the diffusion optical element is relatively small. Since the diffusion optical element will suffice so as long as it has an area that is equivalent to the beam diameter of the light, the interference pattern changing optical element can be downsized. In addition, since the drive unit for driving the diffusion optical element can also be downsized, a compact image display apparatus can be realized.

In the foregoing configuration, preferably, the diffusion optical element is of a tabular shape, and the drive unit oscillates the diffusion optical element so that an angle formed by a principal surface of the diffusion optical element and an optical axis of the light is always constant.

Depending on the angle of the light that enters the diffusion optical element, the transmission factor of the diffusion optical element and the intensity distribution of the output light will change. According to the foregoing configuration, since the angle of the light that enters the diffusion optical element can always be made constant, regardless of the position of the diffusion optical element, it is possible to realize an image display apparatus capable of displaying high quality images free of luminance unevenness and color unevenness.

In the foregoing configuration, preferably, the drive unit is an actuator including a plurality of flexible support members for supporting the diffusion optical element, a magnet, and a coil so that the angle formed by the principal surface of the diffusion optical element and the optical axis of the light is always constant.

According to the foregoing configuration, it is possible to support the oscillating diffusion optical element with a plurality of flexible support members (for example, wires), and drive the diffusion optical element based on the interaction of electromagnetic induction of the magnet and the coil. In the foregoing case, by appropriately selecting the material, wire diameter and length of the flexible support members, it is possible to realize a compact drive unit with a large oscillation amplitude, and consequently realize a compact and low power consumption image display apparatus.

Moreover, more preferably, the drive unit is a biaxially driven actuator for driving the diffusion optical element in a first axis direction and a second axis direction that intersects with the first axis direction in a plane that is perpendicular to the optical axis of the light.

According to the foregoing configuration, the speckle pattern can be made more random by driving the diffusion optical element biaxially, and it is possible to realize a compact image display apparatus capable of displaying high quality images with sufficiently reduced speckle noise.

In the foregoing configuration, preferably, the drive signal of the drive unit includes a resonance frequency of the actuator.

In the foregoing case, it is possible to realize a compact actuator with a large amplitude, and obtain high quality images with sufficiently reduced speckle noise.

In the foregoing configuration, preferably, the image conversion unit includes a liquid crystal display panel, and the light that is output from the light source is linear polarized light.

According to the foregoing configuration, since the linear polarized light that was output from the light source can be input into the liquid crystal display panel and the linear polarized light can be converted into an image with the liquid crystal display panel, it is possible to realize an image display apparatus with high light use efficiency and low power consumption.

In the foregoing configuration, preferably, the diffusion optical element is configured from a first lenticular lens and a second lenticular lens, and an axis direction of a lens of the first lenticular lens and an axis direction of a lens of the second lenticular lens are orthogonal.

As described above, if the linear polarized light output from the light source is caused to enter the liquid crystal display panel, by using a diffusion optical element configured from a first lenticular lens and second lenticular lens in which the axis directions of the lenses are mutually orthogonal, it is possible to spread the light beam without disturbing the polarized light with the diffusion optical element. Thus, it is possible to realize an image display apparatus with high light use efficiency and low power consumption.

In the foregoing configuration, preferably, the drive unit drives the first lenticular lens in the axis direction of the lens of the second lenticular lens with an amplitude that is one pitch length or greater of the first lenticular lens or the drive unit drives the second lenticular lens in the axis direction of the lens of the first lenticular lens with an amplitude that is one pitch length or greater of the second lenticular lens.

According to the foregoing configuration, it is possible to sufficiently increase the number of speckle patterns formed with the first lenticular lens or the second lenticular lens, and thereby realize an image display apparatus with further reduced speckle noise.

The image display apparatus according to another aspect of the present invention includes: at least a red laser light source, a green laser light source and a blue laser light source for outputting a laser beam; an interference pattern changing optical element for temporally changing an interference pattern that is formed with the laser beam; a drive unit for driving and oscillating the interference pattern changing optical element; and an image conversion unit including at least a spatial modulation element for modulating the laser beam based on an image signal, the image display apparatus being a field sequential-type image display apparatus in which the laser light source and the spatial modulation element are driven in synchronization, wherein the drive unit drives the interference pattern changing optical element in synchronization with the laser light source and the spatial modulation element, and the green laser light source does not output a green laser beam in a predetermined time domain including a first time domain in which a temporal change of the interference pattern becomes zero.

According to the foregoing configuration, in a field sequential-type image display apparatus in which the laser light source and the spatial modulation element are driven in synchronization, the drive unit drives the interference pattern changing optical element in synchronization therewith. In addition, when the amplitude of the interference pattern changing optical element that is oscillated and driven by the drive unit becomes maximum or minimum, the temporal change of the interference pattern formed with the laser beam becomes zero. A green laser beam will never be output in the first time domain in which the temporal change of the interference pattern becomes zero. Thus, it is possible to inhibit the speckle noise of the green laser beam, which has higher visibility in comparison to a red laser beam or a blue laser beam, from becoming accentuated, and realize a compact image display apparatus with reduced speckle noise.

In the foregoing configuration, preferably, the green laser light source outputs the green laser beam in a second time domain including a time domain in which the temporal change of the interference pattern becomes maximum.

According to the foregoing configuration, since the green laser light source outputs a green laser beam in the second time domain including a time domain in which the temporal change of the interference pattern becomes maximum, the speckle pattern of the green laser beam will be formed varyingly. Consequently, it is possible to sufficiently reduce the speckle noise of the green laser beam, which has higher visibility in comparison to a red laser beam or a blue laser beam, and realize a compact image display apparatus with reduced speckle noise.

In the foregoing configuration, preferably, of the times in which one cycle of a drive signal of the drive unit is divided into at least four or more times, the green laser beam is output from the green laser light source in at least two or more inconsecutive times.

According to the foregoing configuration, it is possible to realize a compact image display apparatus with reduced speckle noise and inhibited color flickering of the image.

In the foregoing configuration, preferably, an output value of the green laser beam that is output from the green laser light source in the two or more times differs in the respective times.

According to the foregoing configuration, if the speckle pattern of the green laser light source changes depending on the output value of the green laser beam, the foregoing configuration is able to sufficiently increase the number of speckle patterns of the green laser beam. Thus, it is possible to realize a compact image display apparatus with reduced speckle noise.

In the foregoing configuration, preferably, a resonance frequency of the drive unit and a frequency of the drive signal of the drive unit are approximately the same.

According to the foregoing configuration, since the drive unit is driven with the resonance frequency of the oscillation system of the drive unit, the gain of the drive unit can be sufficiently increased even if the drive unit is downsized. Thus, it is possible to sufficiently increase the number of speckle patterns, and realize a compact image display apparatus with reduced speckle noise.

In the foregoing configuration, preferably, the green laser light source is an SHG laser light source which obtains the green laser beam by performing wavelength conversion to an infrared laser beam.

The SHG laser light source can easily achieve a higher output in comparison to the green semiconductor laser light source. Thus, by adopting the foregoing configuration, it is possible to realize a bright image display apparatus with reduced speckle noise and low power consumption.

In the foregoing configuration, preferably, the green laser light source includes an infrared laser light source for outputting an infrared laser beam, a solid laser crystal which is excited with the infrared laser beam, and a wavelength conversion element for performing wavelength conversion to the infrared laser beam excited with the solid laser crystal for conversion into the green laser beam.

By adopting the foregoing configuration, it is possible to realize a compact SHG laser light source, and realize a compact image display apparatus with reduced speckle noise and low power consumption.

In the foregoing configuration, preferably, the drive unit further includes an optical detector, and detects a position of the interference pattern changing optical element by detecting a part of transmitted light which passes through the interference pattern changing optical element or reflected light from the interference pattern changing optical element with the optical detector.

According to the foregoing configuration, since the detection signal of the optical detector according to the positional status of the interference pattern changing optical element can be fed back to the drive operation in the drive unit, regardless of noise or temporal change, it is possible to realize a compact image display apparatus capable of reducing speckle noise with accuracy.

In the foregoing configuration, preferably, the image display apparatus further includes a monitor coil, wherein the drive unit is an electromagnetic guidance actuator, and the monitor coil electromagnetically detects a driving speed of the actuator.

A temporal delay may occur in the operation of the actuator and the drive signal driving the actuator due to the mechanical time delay of the actuator. For example, there may be a gap between the timing in which the amplitude of the actuator becomes maximum and the timing in which the amplitude of the current waveform of the drive signal becomes maximum. Thus, as a result of comprising a monitor coil, the movement of the actuator can be directly observed rather than the drive signal that is applied to the coil.

According to the foregoing configuration, the speed of the actuator can be detected with accuracy, and the speed of the actuator and the synchronization of the spatial modulation element and the laser light source can be acquired with accuracy. Thus, it is possible to realize a compact image display apparatus with accurately reduced speckle noise without having to depend on the time delay of the actuator in relation to the drive signal.

Incidentally, the specific embodiments and examples in the detailed description of the invention are merely provided for demonstrating the technical content of the present invention, and the present invention should not be interpreted narrowly by being limited such specific examples. Thus, the present invention may be implemented in various modes within the spirit of this invention and the scope of claims provided below.

INDUSTRIAL APPLICABILITY

The image display apparatus of the present invention is able to realize a compact image display apparatus with sufficiently reduced speckle noise without having to use a motor or the like, and, since a laser light source is used as the light source, it is effective in realizing an image display apparatus with a broad color reproducible range and low power consumption.

The invention claimed is:
1. An image display apparatus, comprising:
a light source for outputting light to be used for display;
an interference pattern changing optical element for temporally changing an interference pattern that is formed with the light;
a drive unit for driving and oscillating the interference pattern changing optical element in response to a drive signal of which amplitude or frequency is not temporally constant; and
an image conversion unit for converting the light into an image,
wherein the light source includes a green laser light source configured to output a green laser beam, a red laser light source configured to output a red laser beam, and a blue laser light source configured to output a blue laser beam, and
wherein the green laser light source is driven in synchronization with the drive unit so that the green laser light source does not output the green laser beam in a predetermined time domain including a first time domain in which a temporal change of the interference pattern becomes zero, and
wherein the red laser light source and the blue laser light source are driven in synchronization with the drive unit so that the red laser light source outputs the red laser beam or the blue laser light source outputs the blue laser beam at the predetermined time domain including the first time domain in which the temporal change of the interference pattern becomes zero.

2. The image display apparatus according to claim 1, wherein the frequency of the drive signal of the drive unit is 30 Hz or higher.

3. The image display apparatus according to claim 1, wherein the interference pattern changing optical element is a diffusion optical element.

4. The image display apparatus according to claim 3, wherein the diffusion optical element is of a tabular shape, and
wherein the drive unit oscillates the diffusion optical element so that an angle formed by a principal surface of the diffusion optical element and an optical axis of the light is always constant.

5. The image display apparatus according to claim 4, wherein the drive unit is an actuator including a plurality of flexible support members for supporting the diffusion optical element, a magnet, and a coil so that the angle formed by the principal surface of the diffusion optical element and the optical axis of the light is always constant.

6. The image display apparatus according to claim 5, wherein the drive unit is a biaxially driven actuator for driving the diffusion optical element in a first axis direction and a second axis direction that intersects with the first axis direction in a plane that is perpendicular to the optical axis of the light.

7. The image display apparatus according to claim 5, wherein the drive signal of the drive unit includes a resonance frequency of the actuator.

8. The image display apparatus according to claim 1, wherein the image conversion unit includes a liquid crystal display panel, and the light that is output from the light source is linear polarized light.

9. The image display apparatus according to claim 8, wherein the diffusion optical element is configured from a first lenticular lens and a second lenticular lens, and an axis direction of a lens of the first lenticular lens and an axis direction of a lens of the second lenticular lens are orthogonal.

10. The image display apparatus according to claim 9, wherein the drive unit drives the first lenticular lens in the axis direction of the lens of the second lenticular lens with an amplitude that is one pitch length or greater of the first lenticular lens, or
wherein the drive unit drives the second lenticular lens in the axis direction of the lens of the first lenticular lens with an amplitude that is one pitch length or greater of the second lenticular lens.

11. The image display apparatus according to claim 1, wherein the image conversion unit includes at least a spatial modulation element for modulating the laser beam based on an image signal,
wherein the light source and the spatial modulation element are driven in synchronization so that the image display apparatus works as a field sequential-type image display apparatus, and
wherein the drive unit drives the interference pattern changing optical element in synchronization with the laser light source and the spatial modulation element.

12. The image display apparatus according to claim 11, wherein the green laser light source outputs the green laser beam in a second time domain including a time domain in which the temporal change of the interference pattern becomes maximum.

13. The image display apparatus according to claim 12, wherein, of the times in which one cycle of a drive signal of the drive unit is divided into at least four or more times, the green laser beam is output from the green laser light source in at least two or more inconsecutive times.

14. The image display apparatus according to claim 13, wherein an output value of the green laser beam that is output from the green laser light source in the two or more times differs in the respective times.

15. The image display apparatus according to claim 11, wherein a resonance frequency of the drive unit and a frequency of the drive signal of the drive unit are approximately the same.

16. The image display apparatus according to claim 11, wherein the green laser light source is an SHG laser light source which obtains the green laser beam by performing wavelength conversion to an infrared laser beam.

17. The image display apparatus according to claim 11, wherein the green laser light source includes:
an infrared laser light source for outputting an infrared laser beam;
a solid laser crystal which is excited with the infrared laser beam; and
a wavelength conversion element for performing wavelength conversion to the infrared laser beam excited with the solid laser crystal for conversion into the green laser beam.

18. The image display apparatus according to claim 1, wherein the drive unit further includes an optical detector, and detects a position of the interference pattern changing optical element by detecting a part of transmitted light which passes through the interference pattern changing optical element or reflected light from the interference pattern changing optical element with the optical detector.

19. The image display apparatus according to claim 11, further comprising a monitor coil,
wherein the drive unit is an electromagnetic guidance actuator, and
wherein the monitor coil electromagnetically detects a driving speed of the actuator.

* * * * *